US008836670B2

(12) United States Patent
Tsuzaki et al.

(10) Patent No.: US 8,836,670 B2
(45) Date of Patent: Sep. 16, 2014

(54) IMAGE PROCESSING APPARATUS, IMAGE PROCESSING METHOD, IMAGE INPUT DEVICE AND IMAGE INPUT/OUTPUT DEVICE

(75) Inventors: Ryoichi Tsuzaki, Kanagawa (JP); Soichiro Kurokawa, Kanagawa (JP); Tsutomu Harada, Kanagawa (JP); Kazunori Yamaguchi, Kanagawa (JP); Mitsuru Tateuchi, Kanagawa (JP)

(73) Assignee: Japan Display, Inc., Chita (JP)

( * ) Notice: Subject to any disclaimer, the term of this patent is extended or adjusted under 35 U.S.C. 154(b) by 354 days.

(21) Appl. No.: 12/680,567

(22) PCT Filed: Jul. 28, 2009

(86) PCT No.: PCT/JP2009/063382
§ 371 (c)(1), (2), (4) Date: Mar. 27, 2010

(87) PCT Pub. No.: WO2010/016411
PCT Pub. Date: Feb. 11, 2010

(65) Prior Publication Data

US 2010/0253642 A1 Oct. 7, 2010

(30) Foreign Application Priority Data

Aug. 5, 2008 (JP) ................................ 2008-201463

(51) Int. Cl.

| | |
|---|---|
| ***G06F 3/042*** | (2006.01) |
| ***G09G 3/36*** | (2006.01) |
| ***G06F 12/02*** | (2006.01) |
| ***G06K 9/46*** | (2006.01) |
| ***G06F 3/047*** | (2006.01) |
| ***G06F 3/041*** | (2006.01) |

(52) U.S. Cl.
CPC ................ *G06F 3/042* (2013.01); *G06F 3/047* (2013.01); *G06F 3/0416* (2013.01); *G06F 3/0412* (2013.01)
USPC ............ 345/175; 345/104; 345/565; 382/190

(58) Field of Classification Search
USPC ........... 345/81, 104, 173–175, 182–183, 207, 345/556, 559–560, 564–566; 382/190, 192, 382/195–197; 178/18.01–18.03, 178/18.09–18.11
See application file for complete search history.

(56) References Cited

U.S. PATENT DOCUMENTS 4,718,101 A * 1/1988 Ariga et al. ................... 382/180
4,953,224 A * 8/1990 Ichinose et al. ............... 382/149
(Continued)

FOREIGN PATENT DOCUMENTS

EP 1178433 2/2002
EP 1603024 12/2005
(Continued)

*Primary Examiner* — Joe H Cheng
*Assistant Examiner* — Keith Crawley
(74) *Attorney, Agent, or Firm* — Robert J. Depke; The Chicago Technology Law Group, LLC

(57) ABSTRACT

An image processing apparatus which is allowed to achieve a higher speed of a labeling process than ever before is provided. Sequential scanning is performed on pixels in a picked-up image represented by binarized data Din. Moreover, during the sequential scanning, while label information representing an identification number for each connected region in the picked-up image is, as occasion arises, allocated to a target pixel based on values of pixel data of the target pixel and neighboring pixels thereof, additional information (position information and area information) for each connected region corresponding to each label information is updated as occasion arises. Thereby the label information, the position information and the area information about the whole picked-up image are obtained by one sequential scanning process.

11 Claims, 38 Drawing Sheets

(56) References Cited

U.S. PATENT DOCUMENTS

| | | | | | |
|---|---|---|---|---|---|
| 5,199,083 | A | * | 3/1993 | Takeda | 382/180 |
| 5,717,784 | A | * | 2/1998 | Yanagishita et al. | 382/180 |
| 5,909,507 | A | * | 6/1999 | Yanagishita et al. | 382/180 |
| 5,937,091 | A | * | 8/1999 | Yanagishita et al. | 382/180 |
| 6,483,942 | B1 | * | 11/2002 | Curry | 382/194 |
| 6,973,259 | B1 | * | 12/2005 | Todaka | 382/190 |
| 7,190,336 | B2 | | 3/2007 | Fujisawa | |
| 8,121,414 | B2 | * | 2/2012 | Yoshino | 382/194 |
| 2007/0253623 | A1 | * | 11/2007 | Ohira et al. | 382/218 |
| 2008/0136980 | A1 | * | 6/2008 | Rho et al. | 349/12 |

FOREIGN PATENT DOCUMENTS

| | | | | | |
|---|---|---|---|---|---|
| JP | 58-151669 | | | 9/1983 | |
| JP | 61-145689 | | | 7/1986 | |
| JP | 07-175925 | | | 7/1995 | |
| JP | 07175925 | A | * | 7/1995 | G06T 7/00 |
| JP | 2002-164017 | | | 1/2004 | |
| JP | 2008-097172 | | | 4/2008 | |
| JP | 2008097172 | A | * | 4/2008 | G06F 3/042 |

* cited by examiner

LINE BUFFER (IMAGE) 144a

| | | | | | | | | | |
|---|---|---|---|---|---|---|---|---|---|
| | z | z | z | z | z | z | z | z | z |
| z | | | | | | | | | |

LINE BUFFER 144

| | | | | | | | | | |
|---|---|---|---|---|---|---|---|---|---|
| z | z | z | z | z | z | z | z | z | z |

BINARIZED DATA Din

| | | | | | | | | | |
|---|---|---|---|---|---|---|---|---|---|
| | | | | | | | | | |
| | | 1 | | 1 | | 1 | | 1 | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | | 0 |
| b | | 0 |
| c | | 0 |
| d | | 0 |
| e | | 0 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 8

LINE BUFFER (IMAGE) 144a

| | | | | | | | | | |
|---|---|---|---|---|---|---|---|---|---|
| | z | z | z | z | z | z | z | z | z |
| z | | | | | | | | | |

LINE BUFFER 144

| | | | | | | | | | |
|---|---|---|---|---|---|---|---|---|---|
| z | z | z | z | z | z | z | z | z | z |

BINARIZED DATA Din

| | | | | | | | | | |
|---|---|---|---|---|---|---|---|---|---|
| | | | | | | | | | |
| | | 1 | | 1 | | 1 | | 1 | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | | 0 |
| b | | 0 |
| c | | 0 |
| d | | 0 |
| e | | 0 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 9

LINE BUFFER (IMAGE) 144a

| | | | | | | | | | |
|---|---|---|---|---|---|---|---|---|---|
| | | z | z | z | z | z | z | z | z |
| z | z | | | | | | | | |

LINE BUFFER 144

| | | | | | | | | | |
|---|---|---|---|---|---|---|---|---|---|
| z | z | z | z | z | z | z | z | z | z |

BINARIZED DATA Din

| | | | | | | | | | |
|---|---|---|---|---|---|---|---|---|---|
| | | | | | | | | | |
| | | 1 | | 1 | | 1 | | 1 | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | | 0 |
| b | | 0 |
| c | | 0 |
| d | | 0 |
| e | | 0 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 10

LINE BUFFER (IMAGE) 144a

| | | | | | | | | | |
|---|---|---|---|---|---|---|---|---|---|
| | | z | z | z | z | z | z | z | z |
| z | z | | | | | | | | |

LINE BUFFER 144

| | | | | | | | | | |
|---|---|---|---|---|---|---|---|---|---|
| z | z | z | z | z | z | z | z | z | z |

BINARIZED DATA Din

| | | | | | | | | | |
|---|---|---|---|---|---|---|---|---|---|
| | | | | | | | | | |
| | | 1 | | 1 | | 1 | | 1 | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | | 0 |
| b | | 0 |
| c | | 0 |
| d | | 0 |
| e | | 0 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 11

LINE BUFFER (IMAGE) 144a

| | | | | | | | | | |
|---|---|---|---|---|---|---|---|---|---|
| | | z | z | z | z | z | z | z | z |
| z | z | a | | | | | | | |

LINE BUFFER 144

| | | | | | | | | | |
|---|---|---|---|---|---|---|---|---|---|
| z | z | a | z | z | z | z | z | z | z |

BINARIZED DATA Din

| | | | | | | | | | |
|---|---|---|---|---|---|---|---|---|---|
| | | | | | | | | | |
| | | 1 | | 1 | | 1 | | 1 | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 1 | 1 |
| b | | 0 |
| c | | 0 |
| d | | 0 |
| e | | 0 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| 1 | 1 | 2 | 1 | … |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 12

ADDRESS LIST 143

| RegNo | No | Flag |
|---|---|---|
| z | 0 | 1 |
| a | 1 | 1 |
| b | 2 | 0 |
| c | | 0 |
| d | | 0 |
| e | | 0 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| 1 | 1 | 2 | 1 | … |
| 2 | 1 | 4 | 1 | … |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

LINE BUFFER (IMAGE) 144a

| | | | | | | | | | |
|---|---|---|---|---|---|---|---|---|---|
| | | | | | | | | | |
| z | z | a | z | b | z | c | z | d | z |

LINE BUFFER 144

| | | | | | | | | | |
|---|---|---|---|---|---|---|---|---|---|
| z | z | a | z | b | z | c | z | d | z |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 1 | 1 |
| b | 2 | 1 |
| c | 3 | 1 |
| d | 4 | 1 |
| e | | 0 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| 1 | 1 | 2 | 1 | … |
| 2 | 1 | 4 | 1 | … |
| 3 | 1 | 6 | 1 | … |
| 4 | 1 | 8 | 1 | … |
| | | | | |
| | | | | |
| | | | | |
| | | | | |
| | | | | |
| | | | | |
| | | | | |
| | | | | |
| | | | | |
| | | | | |
| | | | | |

FIG. 14

LINE BUFFER (IMAGE) 144a

| | | | | | | | | | |
|---|---|---|---|---|---|---|---|---|---|
| | | a | z | b | z | c | z | d | z |
| z | z | | | | | | | | |

LINE BUFFER 144

| | | | | | | | | | |
|---|---|---|---|---|---|---|---|---|---|
| z | z | a | z | b | z | c | z | d | z |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 1 | 1 |
| b | 2 | 1 |
| c | 3 | 1 |
| d | 4 | 1 |
| e | | 0 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| 1 | 1 | 2 | 1 | … |
| 2 | 1 | 4 | 1 | … |
| 3 | 1 | 6 | 1 | … |
| 4 | 1 | 8 | 1 | … |
| | | | | |
| | | | | |
| | | | | |
| | | | | |
| | | | | |
| | | | | |
| | | | | |
| | | | | |
| | | | | |
| | | | | |
| | | | | |

FIG. 15

LINE BUFFER (IMAGE) 144a

| | | | | | | | | | |
|---|---|---|---|---|---|---|---|---|---|
| | | | | | | | | | |
| z | z | z | e | z | z | z | z | z | z |

LINE BUFFER 144

| | | | | | | | | | |
|---|---|---|---|---|---|---|---|---|---|
| z | z | z | e | z | z | z | z | z | z |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 1 | 1 |
| b | 2 | 1 |
| c | 3 | 1 |
| d | 4 | 1 |
| e | 5 | 1 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| 1 | 1 | 2 | 1 | ... |
| 2 | 1 | 4 | 1 | ... |
| 3 | 1 | 6 | 1 | ... |
| 4 | 1 | 8 | 1 | ... |
| 5 | 1 | 3 | 2 | ... |
| | | | | |
| | | | | |
| | | | | |
| | | | | |
| | | | | |
| | | | | |
| | | | | |
| | | | | |
| | | | | |
| | | | | |
| | | | | |

FIG. 16

LINE BUFFER (IMAGE) 144a

| | | | | | | | | | |
|---|---|---|---|---|---|---|---|---|---|
| | | | | | | | | | |
| z | z | z | e | z | z | z | z | z | z |

LINE BUFFER 144

| | | | | | | | | | |
|---|---|---|---|---|---|---|---|---|---|
| z | z | z | e | z | z | z | z | z | z |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 1 | 0 |
| b | 2 | 0 |
| c | 3 | 0 |
| d | 4 | 0 |
| e | 5 | 1 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| 1 | 1 | 2 | 1 | ... |
| 2 | 1 | 4 | 1 | ... |
| 3 | 1 | 6 | 1 | ... |
| 4 | 1 | 8 | 1 | ... |
| 5 | 1 | 3 | 2 | ... |
| | | | | |
| | | | | |
| | | | | |
| | | | | |
| | | | | |
| | | | | |
| | | | | |
| | | | | |
| | | | | |
| | | | | |

FIG. 17

LINE BUFFER(IMAGE) 144a

| | | | | | | | | | |
|---|---|---|---|---|---|---|---|---|---|
| | | z | e | z | z | z | z | z | z |
| z | a | | | | | | | | |

LINE BUFFER 144

| | | | | | | | | | |
|---|---|---|---|---|---|---|---|---|---|
| z | a | z | e | z | z | z | z | z | z |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 6 | 1 |
| b | 2 | 0 |
| c | 3 | 0 |
| d | 4 | 0 |
| e | 5 | 1 |
| f | | 0 |
| g | | 0 |
| h | | 0 |
| i | | 0 |
| j | | 0 |

ADDITIONAL INFORMATION(Dout)

| No | sum | xsum | ysum | region |
|---|---|---|---|---|
| 1 | 1 | 2 | 1 | … |
| 2 | 1 | 4 | 1 | … |
| 3 | 1 | 6 | 1 | … |
| 4 | 1 | 8 | 1 | … |
| 5 | 1 | 3 | 2 | … |
| 6 | 1 | 1 | 3 | … |
| | | | | |
| | | | | |
| | | | | |
| | | | | |
| | | | | |
| | | | | |
| | | | | |
| | | | | |
| | | | | |

FIG. 18

LINE BUFFER (IMAGE) 144a

| | | | | | | | | | |
|---|---|---|---|---|---|---|---|---|---|
| | | | e | z | z | z | z | z | z |
| z | a | z | e | | | | | | |

LINE BUFFER 144

| | | | | | | | | | |
|---|---|---|---|---|---|---|---|---|---|
| z | a | z | e | z | z | z | z | z | z |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 (6) | | 1 | | 1 | | | | |
| | 1 | 1 | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 6 | 1 |
| b | 2 | 0 |
| c | 3 | 0 |
| d | 4 | 0 |
| e | 5 | 1 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| 1 | 1 | 2 | 1 | … |
| 2 | 1 | 4 | 1 | … |
| 3 | 1 | 6 | 1 | … |
| 4 | 1 | 8 | 1 | … |
| 5 | 1+1 | 3+3 | 2+3 | … |
| 6 | 1 | 1 | 3 | … |
| | | | | |
| | | | | |
| | | | | |
| | | | | |
| | | | | |
| | | | | |
| | | | | |
| | | | | |
| | | | | |

FIG. 19

LINE BUFFER (IMAGE) 144a

| | | | | | | | | | |
|---|---|---|---|---|---|---|---|---|---|
| | | | e | z | b | z | z | z | z |
| z | a | a | | | | | | | |

LINE BUFFER 144

| | | | | | | | | | |
|---|---|---|---|---|---|---|---|---|---|
| z | a | a | e | z | b | z | z | z | z |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 (6) | | 1 (5) | | 1 | | | | |
| | 1 (6) | 1 (6) → | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 6 | 1 |
| b | 7 | 1 |
| c | 3 | 0 |
| d | 4 | 0 |
| e | 5 | 1 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| 1 | 1 | 2 | 1 | … |
| 2 | 1 | 4 | 1 | … |
| 3 | 1 | 6 | 1 | … |
| 4 | 1 | 8 | 1 | … |
| 5 | 2 | 6 | 5 | … |
| 6 | 3 | 4 | 11 | … |
| 7 | 1 | 5 | 3 | … |
| | | | | |
| | | | | |
| | | | | |
| | | | | |
| | | | | |
| | | | | |
| | | | | |
| | | | | |

FIG. 20

LINE BUFFER (IMAGE) 144a

| | | | | | | | | | |
|---|---|---|---|---|---|---|---|---|---|
| | | | e | z | b | z | z | z | z |
| z | a | a | a | | | | | | |

LINE BUFFER 144

| | | | | | | | | | |
|---|---|---|---|---|---|---|---|---|---|
| z | a | a | a | z | b | z | z | z | z |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 (5) | | 1 (5) | | 1 (7) | | | | |
| | 1 (5) | 1 (5) | 1 | 1 | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 5 | 1 |
| b | 7 | 1 |
| c | 3 | 0 |
| d | 4 | 0 |
| e | 5 | 1 |
| f | | 0 |
| g | | 0 |
| h | | 0 |
| i | | 0 |
| j | | 0 |

ADDITIONAL INFORMATION (Dout)

| No | sum | xsum | ysum | region |
|---|---|---|---|---|
| 1 | 1 | 2 | 1 | … |
| 2 | 1 | 4 | 1 | … |
| 3 | 1 | 6 | 1 | |
| 4 | | | 1 | |
| 5 | 6 | 13 | 20 | … |
| 6 | 0 | 0 | 0 | … |
| 7 | 1 | 5 | 3 | … |
| | | | | |
| | | | | |
| | | | | |
| | | | | |
| | | | | |
| | | | | |
| | | | | |
| | | | | |

LINE BUFFER(IMAGE) 144a

| | | | | | | | | | |
|---|---|---|---|---|---|---|---|---|---|
| | | | | z | b | z | z | z | z |
| z | a | a | a | a | a | | | | |

LINE BUFFER 144

| | | | | | | | | | |
|---|---|---|---|---|---|---|---|---|---|
| z | a | a | a | a | a | z | z | z | z |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 (5) | | 1 (5) | | 1 (5) | | | | |
| | 1 (5) | 1 (5) | 1 (5) | 1 (5) | 1 | | | | |
| | | | | | | | | | |
| | | | | | | | | | |
| | | | | | | | | | |

ADDRESS LIST 143

| RegNo | No | Flag |
|---|---|---|
| z | 0 | 1 |
| a | 5 | 1 |
| b | 5 | 1 |
| c | 3 | 0 |
| d | 4 | 0 |
| e | 5 | 1 |
| f | | 0 |
| g | | 0 |
| h | | 0 |
| i | | 0 |
| j | | 0 |

ADDITIONAL INFORMATION(Dout)

| No | sum | xsum | ysum | region |
|---|---|---|---|---|
| 1 | 1 | 2 | 1 | ... |
| 2 | 1 | 4 | 1 | ... |
| 3 | 1 | 6 | 1 | ... |
| 4 | 1 | 8 | 1 | ... |
| 5 | 9 | 27 | 31 | ... |
| 6 | 0 | 0 | 0 | ... |
| 7 | 0 | 0 | 0 | ... |
| | | | | |
| | | | | |
| | | | | |
| | | | | |
| | | | | |
| | | | | |
| | | | | |
| | | | | |

FIG. 23

LINE BUFFER (IMAGE) 144c

| | | | | | | | | | |
|---|---|---|---|---|---|---|---|---|---|
| | 0 | 0 | 0 | 0 | 0 | 0 | 0 | 0 | 0 |
| 0 | | | | | | | | | |

LINE BUFFER 144b

| | | | | | | | | | |
|---|---|---|---|---|---|---|---|---|---|
| 0 | 0 | 0 | 0 | 0 | 0 | 0 | 0 | 0 | 0 |

BINARIZED DATA Din

| | | | | | | | | | |
|---|---|---|---|---|---|---|---|---|---|
| | | | | | | | | | |
| | | 1 | | 1 | | 1 | | 1 | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDITIONAL INFORMATION (Dout)

| No | sum | xsum | ysum | region |
|---|---|---|---|---|
| 0 | 0 | 0 | 0 | 0 |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 0 |
| 0 |
| 0 |
| 0 |
| 0 |
| 0 |
| 0 |
| 0 |
| 0 |
| 0 |
| 0 |
| 0 |
| 0 |
| 0 |

FIG. 28

LINE BUFFER (IMAGE) 144c

| | | | | | | | | | |
|---|---|---|---|---|---|---|---|---|---|
| | 0 | 0 | 0 | 0 | 0 | 0 | 0 | 0 | 0 |
| 0 | | | | | | | | | |

LINE BUFFER 144b

| | | | | | | | | | |
|---|---|---|---|---|---|---|---|---|---|
| 0 | 0 | 0 | 0 | 0 | 0 | 0 | 0 | 0 | 0 |

BINARIZED DATA Din

| | | | | | | | | | |
|---|---|---|---|---|---|---|---|---|---|
| | | | | | | | | | |
| | | 1 | | 1 | | 1 | | 1 | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDITIONAL INFORMATION (Dout)

| No | sum | xsum | ysum | region |
|---|---|---|---|---|
| 0 | 0 | 0 | 0 | 0 |
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 1 |
| 0 |
| 0 |
| 0 |
| 0 |
| 0 |
| 0 |
| 0 |
| 0 |
| 0 |
| 0 |
| 0 |
| 0 |
| 0 |

FIG. 29

LINE BUFFER (IMAGE) 144c

| | | | | | | | | | |
|---|---|---|---|---|---|---|---|---|---|
| | | 0 | 0 | 0 | 0 | 0 | 0 | 0 | 0 |
| 0 | 0 | 1 | | | | | | | |

LINE BUFFER 144b

| | | | | | | | | | |
|---|---|---|---|---|---|---|---|---|---|
| 0 | 0 | 1 | 0 | 0 | 0 | 0 | 0 | 0 | 0 |

BINARIZED DATA Din

| | | | | | | | | | |
|---|---|---|---|---|---|---|---|---|---|
| | | | | | | | | | |
| | | 1 | | 1 | | 1 | | 1 | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDITIONAL INFORMATION (Dout)

| No | sum | xsum | ysum | region |
|---|---|---|---|---|
| 0 | 0 | 0 | 0 | 0 |
| 1 | 1 | 2 | 1 | ... |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 1 |
| 0 |
| 0 |
| 0 |
| 0 |
| 0 |
| 0 |
| 0 |
| 0 |
| 0 |
| 0 |
| 0 |
| 0 |
| 0 |

FIG. 30

LINE BUFFER (IMAGE) 144c

| | | | | | | | | | |
|---|---|---|---|---|---|---|---|---|---|
| | | | | 0 | 0 | 0 | 0 | 0 | 0 |
| 0 | 0 | 1 | 0 | 2 | | | | | |

LINE BUFFER 144b

| | | | | | | | | | |
|---|---|---|---|---|---|---|---|---|---|
| 0 | 0 | 1 | 0 | 2 | 0 | 0 | 0 | 0 | 0 |

BINARIZED DATA Din

| | | | | | | | | | |
|---|---|---|---|---|---|---|---|---|---|
| | | | | | | | | | |
| | | 1 (1) | | 1 | | 1 | | 1 | |
| | | | 1 | | | | | | |
| | 1 | | 1 | | 1 | | | | |
| | 1 | 1 | 1 | 1 | 1 | | | | |
| | | | | | | | | | |
| | | | | | | | | | |
| | | | | | | | | | |

ADDITIONAL INFORMATION (Dout)

| No | sum | xsum | ysum | region |
|---|---|---|---|---|
| 0 | 0 | 0 | 0 | 0 |
| 1 | 1 | 2 | 1 | … |
| 2 | 1 | 4 | 1 | … |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 1 |
| 1 |
| 0 |
| 0 |
| 0 |
| 0 |
| 0 |
| 0 |
| 0 |
| 0 |
| 0 |
| 0 |
| 0 |
| 0 |

FIG. 31

LINE BUFFER (IMAGE) 144c

| | | | | | | | | | |
|---|---|---|---|---|---|---|---|---|---|
| | | | 5 | 0 | 0 | 0 | 0 | 0 | 0 |
| 0 | 6 | 0 | 5 | | | | | | |

LINE BUFFER 144b

| | | | | | | | | | |
|---|---|---|---|---|---|---|---|---|---|
| 0 | 6 | 0 | 5 | 0 | 0 | 0 | 0 | 0 | 0 |

BINARIZED DATA Din

ADDITIONAL INFORMATION (Dout)

| No | sum | xsum | ysum | region |
|---|---|---|---|---|
| 0 | 0 | 0 | 0 | 0 |
| 1 | 1 | 2 | 1 | … |
| 2 | 1 | 4 | 1 | … |
| 3 | 1 | 6 | 1 | … |
| 4 | 1 | 8 | 1 | … |
| 5 | 1+1 | 3+3 | 2+3 | … |
| 6 | 1 | 1 | 3 | … |
| 7 | | | | |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 1 |
| 1 |
| 1 |
| 1 |
| 1 |
| 1 |
| 0 |
| 0 |
| 0 |
| 0 |
| 0 |
| 0 |
| 0 |
| 0 |

LINE BUFFER (IMAGE) 144c

| | | | | | | | | | |
|---|---|---|---|---|---|---|---|---|---|
| | | | 5 | 0 | 0 | 0 | 0 | 0 | 0 |
| 0 | 6 | 0 | 5 | | | | | | |

LINE BUFFER 144b

| | | | | | | | | | |
|---|---|---|---|---|---|---|---|---|---|
| 0 | 6 | 0 | 5 | 0 | 0 | 0 | 0 | 0 | 0 |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 (6) | | 1 (5) | | 1 | | | | |
| | 1 | 1 | 1 | 1 | 1 | | | | |
| | | | | | | | | | |
| | | | | | | | | | |
| | | | | | | | | | |

ADDITIONAL INFORMATION (Dout)

| No | sum | xsum | ysum | region |
|---|---|---|---|---|
| 0 | 0 | 0 | 0 | 0 |
| 1 | 1 | 2 | 1 | … |
| 2 | 1 | 4 | 1 | … |
| 3 | 1 | 6 | 1 | … |
| 4 | 1 | 8 | 1 | … |
| 5 | 2 | 6 | 5 | … |
| 6 | 1 | 1 | 3 | … |
| 7 | | | | |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 1 |
| 1 |
| 1 |
| 1 |
| 1 |
| 1 |
| 0 |
| 0 |
| 0 |
| 0 |
| 0 |
| 0 |
| 0 |
| 0 |

FIG. 33

LINE BUFFER (IMAGE) 144c

| | | | | | | | | | |
|---|---|---|---|---|---|---|---|---|---|
| | | 0 | 5 | 0 | 7 | 0 | 0 | 0 | 0 |
| 0 | 6 | 6 | | | | | | | |

LINE BUFFER 144b

| | | | | | | | | | |
|---|---|---|---|---|---|---|---|---|---|
| 0 | 6 | 6 | 5 | 0 | 7 | 0 | 0 | 0 | 0 |

BINARIZED DATA Din

ADDITIONAL INFORMATION (Dout)

| No | sum | xsum | ysum | region |
|---|---|---|---|---|
| 0 | 0 | 0 | 0 | 0 |
| 1 | 1 | 2 | 1 | … |
| 2 | 1 | 4 | 1 | … |
| 3 | 1 | 6 | 1 | … |
| 4 | 1 | 8 | 1 | … |
| 5 | 2 | 6 | 5 | … |
| 6 | 2+1 | 2+2 | 7+4 | … |
| 7 | 1 | 5 | 3 | … |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 1 |
| 1 |
| 1 |
| 1 |
| 1 |
| 1 |
| 1 |
| 0 |
| 0 |
| 0 |
| 0 |
| 0 |
| 0 |
| 0 |

LINE BUFFER (IMAGE) 144c

| | | | | | | | | | |
|---|---|---|---|---|---|---|---|---|---|
| | | | 5 | 0 | 7 | 0 | 0 | 0 | 0 |
| 0 | 6 | 6 | 5 | | | | | | |

LINE BUFFER 144b

| | | | | | | | | | |
|---|---|---|---|---|---|---|---|---|---|
| 0 | 6 | 6 | 5 | 0 | 7 | 0 | 0 | 0 | 0 |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 (6) | | 1 (5) | | 1 (7) | | | | |
| | 1 (6) | 1 (6) → | 1 | 1 | 1 | | | | |
| | | | | | | | | | |
| | | | | | | | | | |
| | | | | | | | | | |

ADDITIONAL INFORMATION (Dout)

| No | sum | xsum | ysum | region |
|---|---|---|---|---|
| 0 | 0 | 0 | 0 | 0 |
| 1 | 1 | 2 | 1 | … |
| 2 | 1 | 4 | 1 | … |
| 3 | 1 | 6 | 1 | … |
| 4 | 1 | 8 | 1 | … |
| 5 | 2+3+1 | 6+4+3 | 5+11+4 | … |
| 6 | ③ | ④ | ⑪ | … |
| 7 | 1 | 5 | 3 | … |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 1 |
| 1 |
| 1 |
| 1 |
| 1 |
| 1 |
| 1 |
| 0 |
| 0 |
| 0 |
| 0 |
| 0 |
| 0 |
| 0 |

FIG. 35

LINE BUFFER (IMAGE) 144c

| | | | | | | | | | |
|---|---|---|---|---|---|---|---|---|---|
| | | | | 0 | 7 | 0 | 0 | 4 | 0 |
| 0 | 5 | 5 | 5 | | | | | | |

LINE BUFFER 144b

| | | | | | | | | | |
|---|---|---|---|---|---|---|---|---|---|
| 0 | 5 | 5 | 5 | 0 | 7 | 0 | 0 | 0 | 0 |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 (5) | | 1 (5) | | 1 (7) | | | | |
| | 1 (5) | 1 (5) | 1 | 1 | 1 | | | | |
| | | | | | | | | | |
| | | | | | | | | | |
| | | | | | | | | | |

ADDITIONAL INFORMATION (Dout)

| No | sum | xsum | ysum | region |
|---|---|---|---|---|
| 0 | 0 | 0 | 0 | 0 |
| 1 | 1 | 2 | 1 | … |
| 2 | 1 | 4 | 1 | … |
| 3 | 1 | 6 | 1 | … |
| 4 | 1 | 8 | 1 | … |
| 5 | 6 | 13 | 20 | … |
| 6 | 0 | 0 | 0 | 0 |
| 7 | 1 | 5 | 3 | … |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 1 |
| 1 |
| 1 |
| 1 |
| 1 |
| 0 |
| 1 |
| 0 |
| 0 |
| 0 |
| 0 |
| 0 |
| 0 |
| 0 |

FIG. 36

LINE BUFFER(IMAGE) 144c

| | | | | | | | | | |
|---|---|---|---|---|---|---|---|---|---|
| | | | | | | 0 | 0 | 0 | 0 |
| 0 | 5 | 5 | 5 | 5 | 5 | | | | |

LINE BUFFER 144b

| | | | | | | | | | |
|---|---|---|---|---|---|---|---|---|---|
| 0 | 5 | 5 | 5 | 5 | 5 | 0 | 0 | 0 | 0 |

BINARIZED DATA Din

| | | | | | | | | | |
|---|---|---|---|---|---|---|---|---|---|
| | | | | | | | | | |
| | | 1 (1) | | 1 (2) | | 1 (3) | | 1 (4) | |
| | | | 1 (5) | | | | | | |
| | 1 (5) | | 1 (5) | | 1 (5) | | | | |
| | 1 (5) | 1 (5) | 1 (5) | 1 (5) | 1 (5) | | | | |
| | | | | | | | | | |
| | | | | | | | | | |
| | | | | | | | | | |

ADDITIONAL INFORMATION(Dout)

| No | sum | xsum | ysum | region |
|---|---|---|---|---|
| 0 | 0 | 0 | 0 | 0 |
| 1 | 1 | 2 | 1 | … |
| 2 | 1 | 4 | 1 | … |
| 3 | 1 | 6 | 1 | … |
| 4 | 1 | 8 | 1 | … |
| 5 | 9 | 27 | 31 | … |
| 6 | 0 | 0 | 0 | … |
| 7 | 0 | 0 | 0 | … |
| 8 | | | | |
| 9 | | | | |
| 10 | | | | |
| 11 | | | | |
| 12 | | | | |
| 13 | | | | |
| 14 | | | | |

FREE ADDERESS INFORMATION

| Blank list |
|---|
| 1 |
| 1 |
| 1 |
| 1 |
| 1 |
| 1 |
| 0 |
| 0 |
| 0 |
| 0 |
| 0 |
| 0 |
| 0 |
| 0 |
| 0 |

FIG. 37

IMAGE PROCESSING APPARATUS, IMAGE PROCESSING METHOD, IMAGE INPUT DEVICE AND IMAGE INPUT/OUTPUT DEVICE

CROSS REFERENCES TO RELATED APPLICATIONS

This application is a 371 U.S. National Stage filing of PCT/JP2009/063382, filed Jul. 28, 2009, which claims priority to Japanese Patent Application Number JP 2008-201463 filed Aug. 5, 2008, all of which are incorporated herein by reference.

TECHNICAL FIELD

The present invention relates to an image input device including an image pickup function, an image input/output device including an image display function and an image pickup function, and an image processing apparatus and an image processing method applied to a labeling process in such an image input device or such an image input/output device.

BACKGROUND ART

Some image displays include touch panels. Types of touch panels include an optical type touch panel optically detecting a finger or the like in addition to a resistance type touch panel using a change in electrical resistance and a capacitance type touch panel using a change in capacitance. For example, in the optical type touch panel, an image is displayed on a display surface thereof by modulating light from a backlight in a liquid crystal element, and light emitted from the display surface and then reflected from a proximity object such as a finger is received by photoreception elements arranged on the display surface so as to detect the position or the like of the proximity object. Patent Document 1 discloses such an image display. The display disclosed in Patent Document 1 includes a display section including a display means for displaying an image and an image-pickup means for picking up an image of an object.

When such an optical type touch panel detects a plurality of points, in some cases, a process of providing an identification number to each connected region considered as one set of points is performed on data captured as an image from photoreception elements (for example, refer to Patent Document 2). Such a process is called a labeling process.

RELATED ART DOCUMENTS

Patent Document

[Patent Document 1] Japanese Unexamined Patent Application Publication No. 2004-127272

[Patent Document 2] Japanese Unexamined Patent Application Publication No. 2002-164017

DISCLOSURE OF THE INVENTION

However, in a labeling process in related art in Patent Document 2 or the like, two-dimensional data as a labeling image is temporarily stored in a frame memory, and the labeling process is performed based on the labeling image. Therefore, it is difficult to perform a real-time process on data obtained from photoreception elements, and it is desirable to achieve a higher speed of a labeling process.

The present invention is made to solve the above-described issue, and it is an object of the invention to provide an image processing apparatus and an image processing method which are allowed to achieve a higher speed of a labeling process than ever before, and an image input device and an image input/output device which includes such an image processing apparatus.

An image processing apparatus of the invention includes: a scanning section performing sequential scanning on pixels in an image represented by binarized pixel data; and an information obtaining section performing a process so that during the sequential scanning on the pixels, while label information representing an identification number for each connected region in the image is, as occasion arises, allocated to a target pixel based on values of pixel data of the target pixel and neighboring pixels thereof, position information and area information for each connected region corresponding to each label information are updated as occasion arises, and thereby acquisition of the label information, the position information and the area information about the whole image is completed on completion of the sequential scanning. Herein, "connected region" means pixel region which is allowed to be considered as one set of points.

An image processing method of the invention including: performing sequential scanning on pixels in an image represented by binarized pixel data, and performing a process so that during the sequential scanning on the pixels, while label information representing an identification number for each connected region in the image is, as occasion arises, allocated to a target pixel based on values of pixel data of the target pixel and neighboring pixels thereof, position information and area information for each connected region corresponding to each label information are updated as occasion arises, and thereby acquisition of the label information, the position information and the area information about the whole image is completed on completion of the sequential scanning.

An image input device of the invention includes: an input panel including a plurality of photoreception elements arranged along an image pickup surface to receive light reflected from an external proximity object; a scanning section performing sequential scanning on pixels in a picked-up image represented by binarized pixel data, the picked-up image being obtained based on photoreception signals from the photoreception elements; an information obtaining section performing a process so that during the sequential scanning on the pixels, while label information representing an identification number for each connected region in the picked-up image is, as occasion arises, allocated to a target pixel based on values of pixel data of the target pixel and neighboring pixels thereof, position information and area information for each connected region corresponding to each label information are updated as occasion arises, and thereby acquisition of the label information, the position information and the area information about the whole picked-up image is completed on completion of the sequential scanning; and a position detection section obtaining information about one or more of the position, shape and size of the external proximity object based on the label information, the position information and the area information obtained by the information obtaining section.

A first image input/output device of the invention includes: an input/output panel including a plurality of display elements arranged along a display surface to display an image based on an image signal and a plurality of photoreception elements arranged along the display surface to receive light reflected from an external proximity object; a scanning section performing sequential scanning on pixels in a picked-up image represented by binarized pixel data, the picked-up image being obtained based on photoreception signals from the photoreception elements; an information obtaining section performing a process so that during the sequential scanning on the pixels, while label information representing an identification number for each connected region in the picked-up image is, as occasion arises, allocated to a target pixel based on values of pixel data of the target pixel and neighboring pixels thereof, position information and area information for each connected region corresponding to each label information are updated as occasion arises, and thereby acquisition of the label information, the position information and the area information about the whole picked-up image is completed on completion of the sequential scanning; and a position detection section obtaining information about one or more of the position, shape and size of the external proximity object based on the label information, the position information and the area information obtained by the information obtaining section.

A second image input/output device of the invention includes: an input/output panel including a display panel and a position detection section formed in the display panel, the display panel including a liquid crystal layer between a first substrate and a second substrate, the position detection section including a first sensor electrode and a second electrode which are allowed to come into contact with each other when the second substrate is depressed and detecting a depressed position of the second substrate corresponding to the position of an external proximity object by detecting a change in potential caused by contact between the first sensor electrode and the second sensor electrode; a scanning section performing sequential scanning on pixels in an image represented by binarized pixel data, the image being obtained based on photoreception signals from the photoreception elements; an information obtaining section performing a process so that during the sequential scanning on the pixels, while label information representing an identification number for each connected region in the image is, as occasion arises, allocated to a target pixel based on values of pixel data of the target pixel and neighboring pixels thereof, position information and area information for each connected region corresponding to each label information are updated as occasion arises, and thereby acquisition of the label information, the position information and the area information about the whole image is completed on completion of the sequential scanning; and a position detection section obtaining information about one or more of the position, shape and size of the external proximity object based on the label information, the position information and the area information obtained by the information obtaining section.

In the image processing apparatus, the image processing method, the image input device and the image input/output devices of the invention, sequential scanning is performed on pixels in an image (for example, a picked-up image) represented by binarized pixel data. At this time, while label information representing an identification number for each connected region in the image is, as occasion arises, allocated to a target pixel according to value of pixel data of the target pixel and neighboring pixels thereof, position information and area information for each connected region corresponding to each label information are updated as occasion arises. Thereby, acquisition of the label information, the above-described position information and the above-described area information about the whole image is completed on completion of such sequential scanning. In other words, unlike related art, it is not necessary to form a labeling image, and label information and the like about the whole image are obtained by one sequential scanning process.

According to the image processing apparatus, the image processing method, the image input device and the image input/output devices of the invention, sequential scanning is performed on pixels in an image represented by binarized pixel data, and during sequential scanning, while label information representing an identification number for each connected region in the image is, as occasion arises, allocated to a target pixel based on values of pixel data of the target pixel and neighboring pixels thereof, position information and area information for each connected region corresponding to each label information are updated as occasion arises, so label information, the above-described position information and the above-described area information about the whole image are obtainable by one sequential scanning process. Therefore, a higher speed of a labeling process than ever before is achievable.

BRIEF DESCRIPTION OF THE DRAWINGS

FIG. 8 is a schematic view for describing details of the labeling process of the first embodiment.

FIG. 9 is a schematic view for describing the details of the labeling process following FIG. 8.

FIG. 10 is a schematic view for describing the details of the labeling process following FIG. 9.

FIG. 11 is a schematic view for describing the details of the labeling process following FIG. 10.

FIG. 12 is a schematic view for describing the details of the labeling process following FIG. 11.

FIG. 14 is a schematic view for describing the details of the labeling process following FIG. 13.

FIG. 15 is a schematic view for describing the details of the labeling process following FIG. 14.

FIG. 16 is a schematic view for describing the details of the labeling process following FIG. 15.

FIG. 17 is a schematic view for describing the details of the labeling process following FIG. 16.

FIG. 18 is a schematic view for describing the details of the labeling process following FIG. 17.

FIG. 19 is a schematic view for describing the details of the labeling process following FIG. 18.

FIG. 20 is a schematic view for describing the details of the labeling process following FIG. 19.

FIG. 22 is a schematic view for describing the details of the labeling process following FIG. 21.

FIG. 23 is a schematic view for describing the details of the labeling process following FIG. 22.

FIG. 28 is a schematic view for describing details of the labeling process of the second embodiment.

FIG. 29 is a schematic view for describing the details of the labeling process following FIG. 28.

FIG. 30 is a schematic view for describing the details of the labeling process following FIG. 29.

FIG. 31 is a schematic view for describing the details of the labeling process following FIG. 30.

FIG. 33 is a schematic view for describing the details of the labeling process following FIG. 32.

FIG. 35 is a schematic view for describing the details of the labeling process following FIG. 34.

FIG. 36 is a schematic view for describing the details of the labeling process following FIG. 35.

FIG. 37 is a schematic view for describing the details of the labeling process following FIG. 36.

BEST MODE(S) FOR CARRYING OUT THE INVENTION

Embodiments of the invention will be described in detail below referring to the accompanying drawings.

First Embodiment

Figure 1:
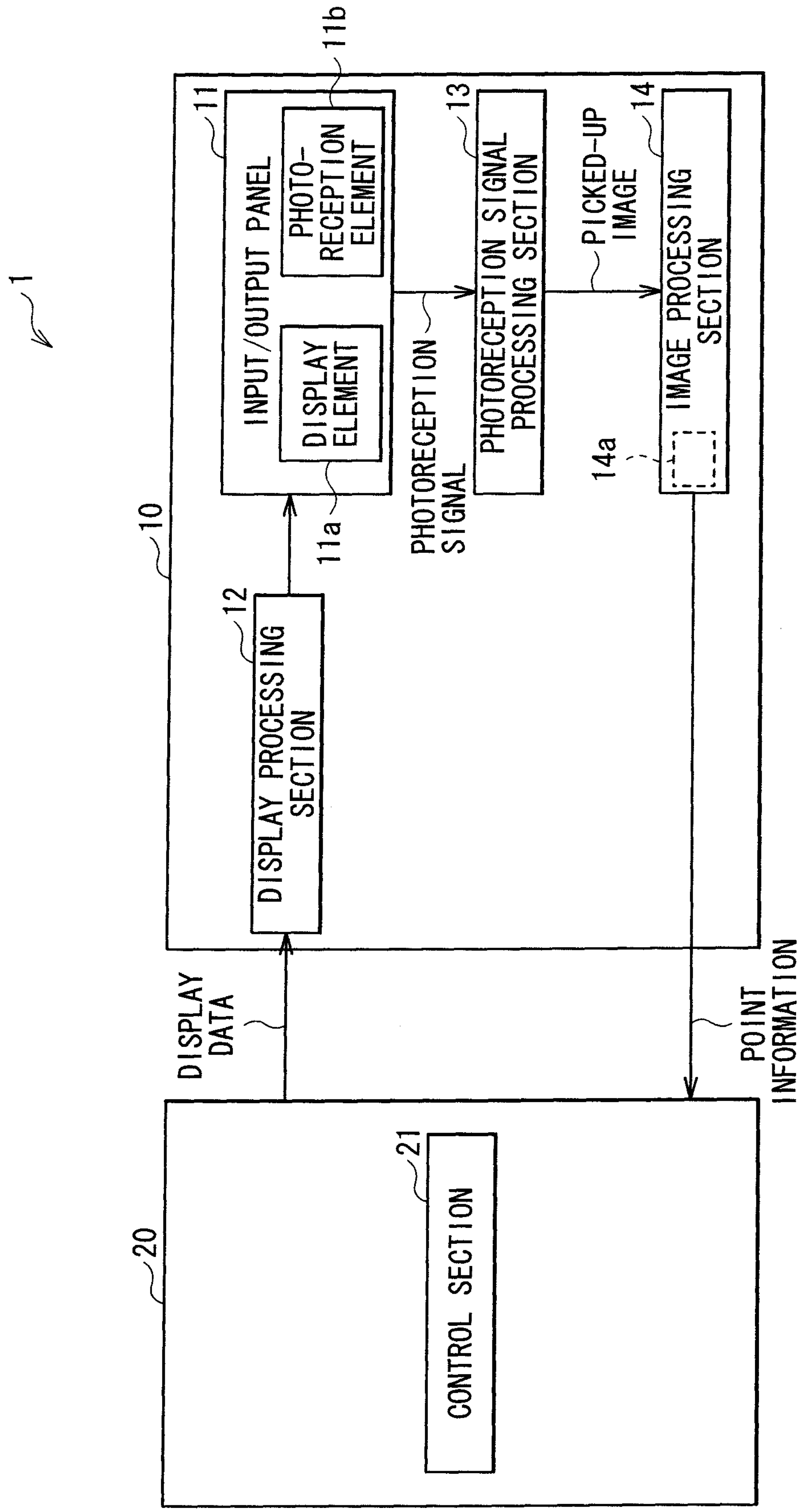
FIG. 1 is a block diagram illustrating a configuration of an image input/output device according to a first embodiment of the invention.
Figure 2:
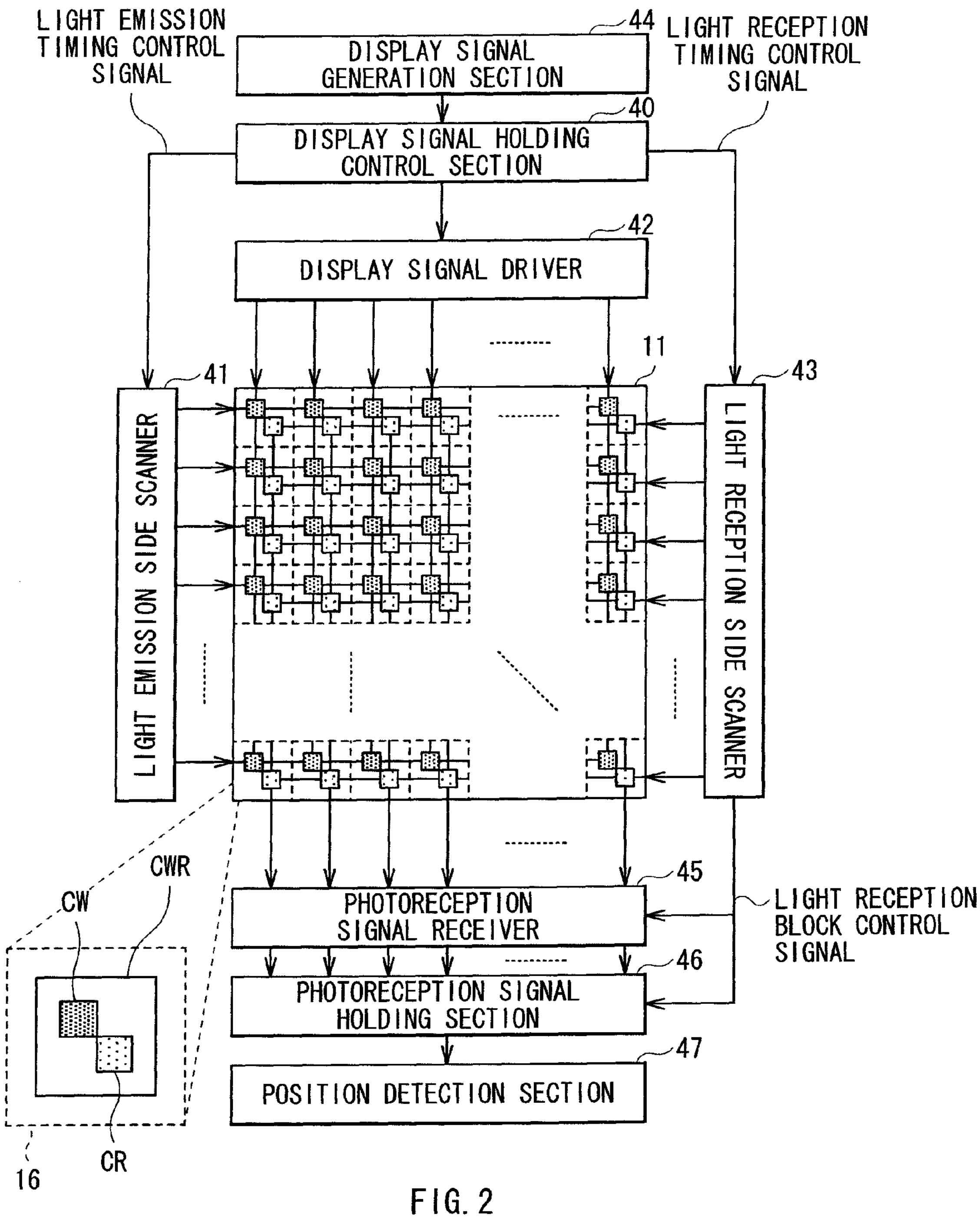
FIG. 2 is a block diagram illustrating a more specific configuration of the image input/output device in FIG. 1.
Figure 3:
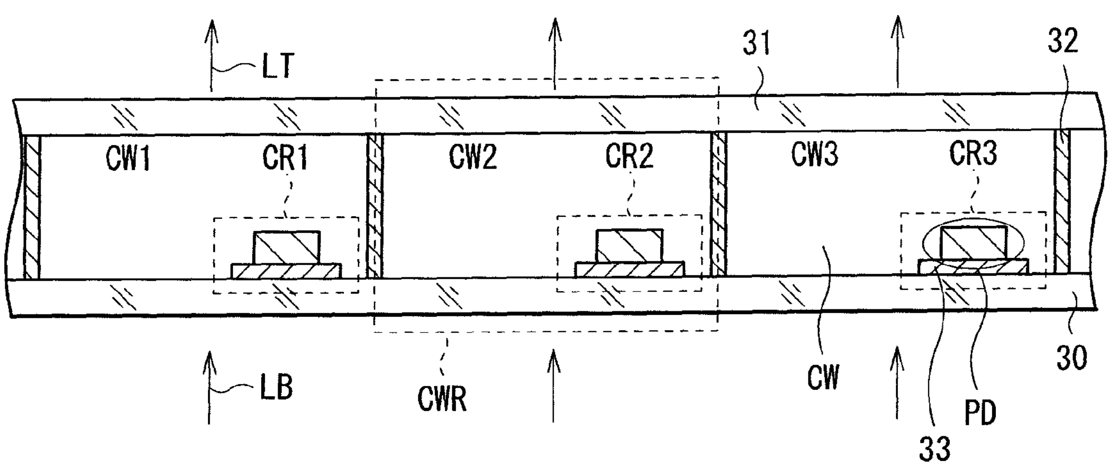
FIG. 3 is an enlarged sectional view of a part of an input/output panel.

FIG. 1 illustrates a schematic configuration of an image input/output device 1 according to a first embodiment of the invention. Moreover, FIG. 2 illustrates a specific configuration of the image input/output device 1 according to the embodiment. Further, FIG. 3 illustrates an enlarged sectional view of a part of an input/output panel. As illustrated in FIG. 1, the image input/output device 1 according to the embodiment includes a display 10 and an electronic device body 20 using the display 10. The display 10 includes an input/output panel 11, a display signal processing section 12, a photoreception signal processing section 13 and an image processing section 14, and the electronic device body 20 includes a control section 21. In addition, an image processing method according to a first embodiment of the invention is embodied by the image input/output device 1 of the embodiment, and will be also described below.

As illustrated in FIG. 2, the input/output panel 11 is configured of a liquid crystal display panel in which a plurality of pixels 16 are arranged in a matrix form, and includes display elements 11*a* and photoreception elements 11*b*. The display elements 11*a* are liquid crystal elements displaying an image such as a graphic or a character on a display surface through the use of light emitted from a backlight as a light source. The photoreception elements 11*b* are, for example, photoreception elements such as photodiodes receiving light to output an electrical signal in response to reception of the light. The photoreception elements 11*b* receive reflected light which is emitted from the backlight, and then is reflected back from an external proximity object such as a finger located outside of the input/output panel 11, and then the photoreception elements 11*b* output photoreception signals in response to reception of the reflected light. In the embodiment, a plurality of the photoreception elements 11*b* are arranged in pixels 16, respectively, in a plane.

As illustrated in FIGS. 2 and 3, the input/output panel 11 is configured by arranging a plurality of light emission/reception cells CWR, which are separated from one another by barrier ribs 32, in a matrix form between a pair of transparent substrates 30 and 31. The light emission/reception cells WR include light emission cells CW (CW1, CW2, CW3, . . . ) and a plurality of light reception cells CR (CR1, CR2, CR3, . . . ) contained in the light emission cells CW. The light emission cell CW is configured of a liquid crystal cell as the display element 11*a*, and the light reception cells CR each include a photoreception element PD as the photoreception element 11*b*. In addition, in the light reception cell CR, a shielding layer 33 is arranged between the transparent substrate 30 on the backlight side and the photoreception element PD so as to prevent light LB emitted from the backlight from entering into the light reception cell CR, thereby each photoreception element PD detects only light entering from the transparent substrate 31 on a side opposite to the backlight side without influence of backlight light LB.

The display signal processing section 21 illustrated in FIG. 1 is a circuit which is connected to a former stage of the input/output panel 11 and drives the input/output panel 11 so as to display an image based on display data.

As illustrated in FIG. 2, the display signal processing section 12 includes a display signal holding control section 40, a light emission side scanner 41, a display signal driver 42 and a light reception side scanner 43. The display signal holding control section 40 stores and holds display signals outputted from a display signal generation section 44 for each screen (for each field of display) in a field memory configured of, for example, an SRAM (Static Random Access Memory) or the like, and has a function of controlling the light emission side scanner 41 and the display signal driver 42 which drive each light emission cell CW, and the light reception side scanner 43 which drives each light reception cell CR to operate in conjunction with one another. More specifically, a light emission timing control signal and a light reception timing control signal are outputted to the light emission side scanner 41 and the light reception side scanner 43, respectively, and display signals for one horizontal line are outputted to the display signal driver 42 based on a control signal and the display signals held in the field memory. A line-sequential operation is performed in response to the control signal and the display signals.

The light emission side scanner 41 has a function of selecting a light emission cell CW to be driven in response to the light emission timing control signal outputted from the display signal holding control section 40. More specifically, a light emission selection signal is supplied through a light emission gate line connected to each pixel 16 of the input/output panel 11 to control a light-emitting element selection switch. In other words, when a voltage for turning on the light-emitting element selection switch of a given pixel 16 is applied in response to the light emission selection signal, the pixel 16 emits light with a luminance corresponding to a voltage supplied from the display signal driver 42.

The display signal driver 42 has a function of supplying display data to a light emission cell CW to be driven in response to display signals for one horizontal line outputted from the display signal holding control section 40. More specifically, a voltage corresponding to display data is supplied to the pixel 16 selected by the above-described light emission side scanner 41 through a data supply line connected to each pixel 16 of the input/output panel 11. When the light emission side scanner 41 and the display signal driver 42 perform line-sequential operations in conjunction with each other, an image corresponding to arbitrary display data is displayed on the input/output panel 11.

The light reception side scanner 43 has a function of selecting a light reception cell CR to be driven in response to the light reception timing control signal outputted from the display signal holding control section 40. More specifically, a light reception selection signal is supplied through a light reception gate line connected to each pixel 16 of the input/output panel 11 to control a photoreception element selection switch. In other words, as in the case of the operation of the above-described light emission side scanner 41, when a voltage for turning on a photoreception element selection switch of a given pixel 16 is applied in response to the light reception selection signal, a photoreception signal detected by the pixel 16 is outputted to the photoreception signal receiver 45. Thereby, for example, light reflected from an object touching or in proximity to the input/output panel 11 from light emitted from a given light emission cell CW is allowed to be received and detected by the light reception cell CR. Moreover, the light reception side scanner 43 outputs a light reception block control signal to the photoreception signal receiver 45 and the photoreception signal holding section 46, and also has a function of controlling a block contributing to these light reception operations. In addition, in the information input/output device 1 of the embodiment, the above-described light emission gate line and the above-described light reception gate line are separately connected to each of the light-emission/reception cells CWR, and the light emission side scanner 41 and the light reception side scanner 43 are operable independently.

The photoreception signal processing section 13 illustrated in FIG. 1 is connected to a latter stage of the input/output panel 11, and captures a photoreception signal from the photoreception element 11*b* to perform the amplification or the like. As illustrated in FIG. 2, the photoreception signal processing section 13 includes a photoreception signal receiver 45 and a photoreception signal holding section 46.

The photoreception signal receiver 45 has a function of obtaining photoreception signals for one horizontal line from the light reception cells CR in response to the light reception block control signal outputted from the light reception side scanner 43. The photoreception signals for one horizontal line obtained in the photoreception signal receiver 45 are outputted to the photoreception signal holding section 46.

The photoreception signal holding section 46 has a function of reconstructing photoreception signals for each screen (for each field of display) from the photoreception signals outputted from the photoreception signal receiver 45 in response to the light reception block control signal outputted from the light reception side scanner 43, and storing and holding the photoreception signals in, for example, a field memory configured of an SRAM or the like. Data of the photoreception signals stored in the photoreception signal holding section 46 is outputted to a position detection section 47 in the image processing section 14 (refer to FIG. 1). In addition, the photoreception signal holding section 46 may be configured of a storage element except for a memory, and, for example, the photoreception signals may be held as analog data (an electric charge) in a capacitive element.

The image processing section 14 (refer to FIG. 1) is a circuit which is connected to a latter stage of the photoreception signal processing section 13, and captures a picked-up image from the photoreception signal processing section 13, and then performs a process such as binarization, noise removal or labeling to obtain point information about an external proximity object, that is, information about the barycenter or central coordinates of the external proximity object and the region (size or shape) of the external proximity object.

More specifically, a labeling process section 14*a* (an image processing apparatus) in the image processing section 14 performs a labeling process as will be described below so as to obtain label information about the whole picked-up image (information representing identification numbers of connected regions in the picked-up image), and position information and area information for each connected region. In other words, as will be described in detail later, the labeling process section 14*a* performs sequential scanning on pixels in the picked-up image represented by binarized pixel data, and during the sequential scanning, while label information is, as occasion arises, allocated to a target pixel based on values of pixel data of the target pixel and neighboring pixels thereof, position information and area information for each connected region corresponding to each label information are updated as occasion arises, and thereby the above-described label information, the above-described position information and the above-described area information are obtained. In addition, the labeling process section 14*a* corresponds to a specific example of "a scanning section" and "an information obtaining section" in the invention.

Moreover, the position detection section 47 (refer to FIG. 2) in the image processing section 14 performs a signal process based on the above-described label information, the above-described position information and the above-described area information obtained by the labeling process section 14*a* so as to specify a position or the like where an object detected by the light reception cell CR is located. Thereby, the position of a finger or the like touching or in proximity to the input/output panel 11 is allowed to be specified.

The electronic device body 20 (refer to FIG. 1) outputs display data to the display signal processing section 12 of the display 10, and point information from the image processing section 14 is inputted into the electronic device body 20. The control section 21 changes a display image through the use of the point information.

As illustrated in FIG. 2, the control section 21 (refer to FIG. 1) includes the display signal generation section 44. The display signal generation section 44 is configured of a CPU (Central Processing Unit) (not illustrated) or the like, and generates a display signal for displaying each screen (each field of display) based on supplied image data to output the display signal to the display signal holding control section 40.

Figure 4:
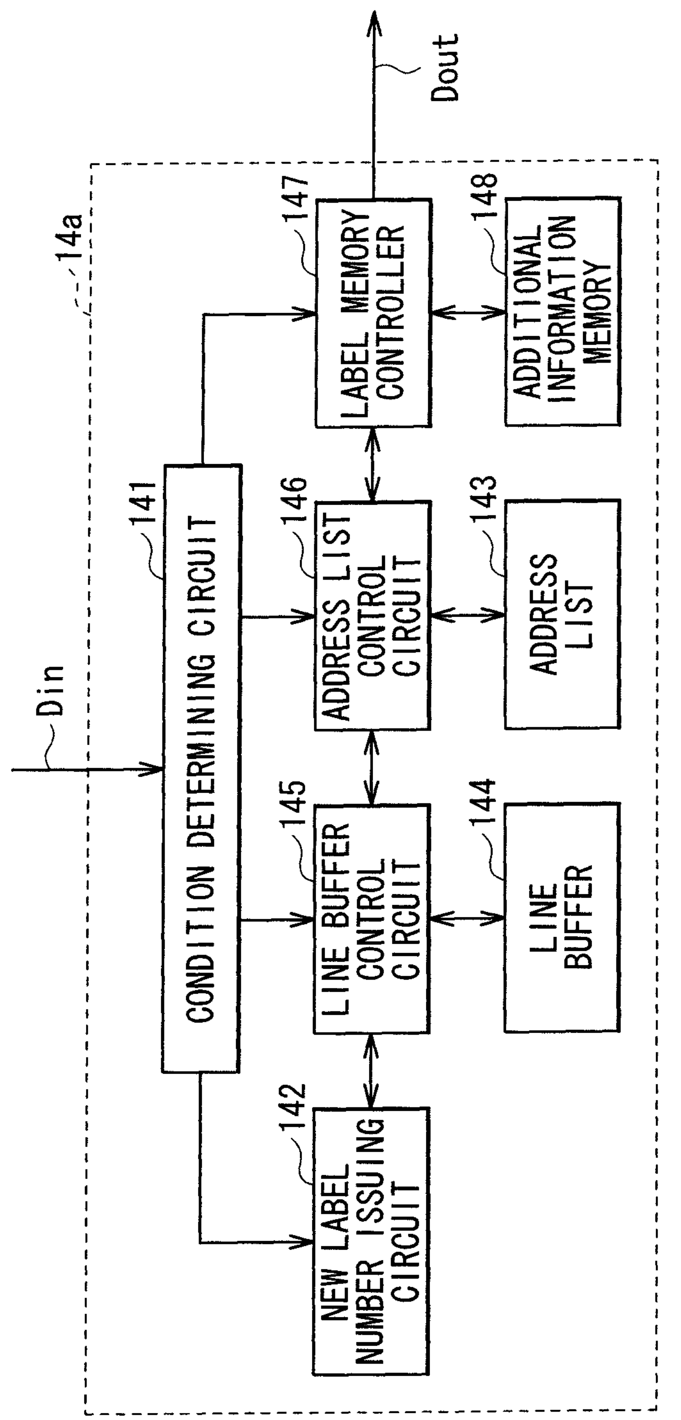
FIG. 4 is a block diagram illustrating a more specific configuration of a labeling process section in FIG. 1.

Next, referring to FIGS. 4 and 5, a specific configuration of the labeling process section 14*a* will be described below. FIG. 4 illustrates a block diagram of the specific configuration of the labeling process section 14*a*. Moreover, FIG. 5 schematically illustrates an example of binarized data, a line buffer, an address list and additional information used in the labeling process of the embodiment.

As illustrated in FIG. 4, the labeling process section 14*a* includes a condition determining circuit 141, a new label number issuing circuit 142, an address list 143, a line buffer 144, a line buffer control circuit 145, an address list control circuit 146, a label memory controller 147 and an additional information memory 148.

Figure 5:
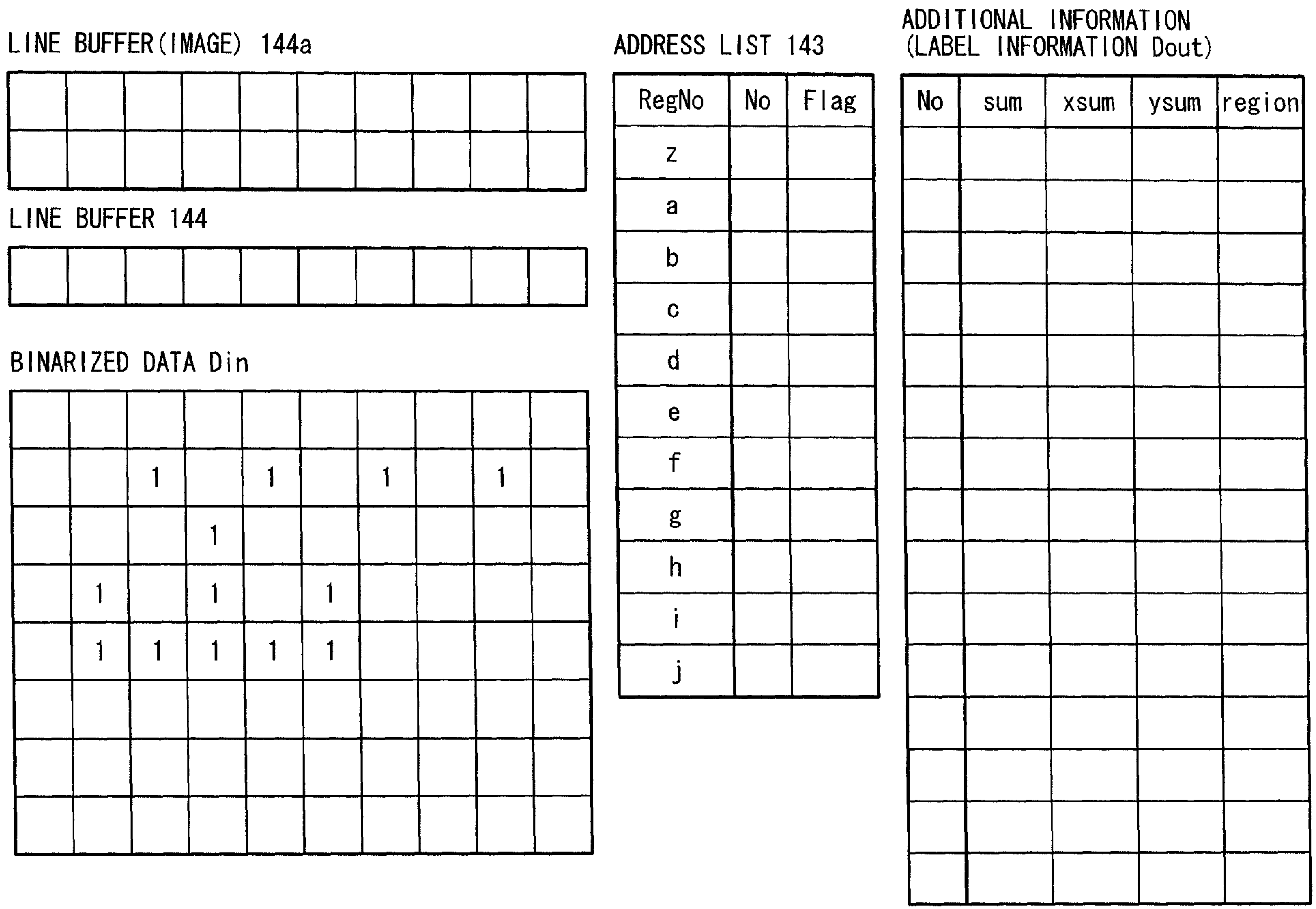
FIG. 5 is a schematic view illustrating an example of binarized data, a line buffer, an address list and additional information used in a labeling process of the first embodiment.

The condition determining circuit 141 sequentially obtains binarized data Din as binarized pixel data as illustrated in, for example, FIG. 5 to determine, based on the values of the pixel data of the target pixel and neighboring pixels thereof, whether or not to perform a process of allocating label information and a process of updating position information and area information for each connected region. More specifically, the condition determining circuit 141 determines whether the value of pixel data of the target pixel is valid or invalid (in this case, whether the value is a valid value "1" or an invalid value "0" is determined), and gives a command for issuing and allocating an invalid label or a new label (new label information) and a command for a label integration (consolidation) task referring to label information about the neighboring pixels (in this case, a pixel on the left of the target pixel and a pixel above the target pixel). Further, when the target pixel is located at an end of one line (in this case, a right end), the condition determining circuit 141 gives a command for rearranging the address list.

The new label number issuing circuit 142 issues a new label based on a determination result by the condition determining circuit 141. More specifically, in the case where a label is new, an unallocated register number (corresponding to label information) is issued in the address list 143.

For example, as illustrated in FIG. 5, the line buffer 144 is a section storing one line of register numbers (label information). In addition, a line buffer (image) 144*a* illustrated in FIG. 5 or the like is illustrated for the sake of convenience to describe the labeling process which will be described later, and the actual line buffer 144 is a buffer containing one line.

The line buffer control circuit 145 controls writing, reading and the like of the register numbers in the line buffer 144.

The additional information memory 148 associates, for example, additional information illustrated in FIG. 5, that is, position information (xsum; a total value of x-coordinate values in each connected region, ysum; a total value of y-coordinate values in each connected region, region; minimum values, maximum values or the like of an x coordinate and a y coordinate in each connected region) and area information (sum; the number of pixels in the connected region) for each connected region corresponding to each label information with a label number (corresponding to an address number), and then stores the additional information.

For example, as illustrated in FIG. 5, the address list 143 associates register numbers (RegNo; corresponding to label information) stored in the line buffer 144, label numbers stored in the additional information memory 148 (No; corresponding to address numbers) and a state of whether or not label information is allocated (Flag) with one another, and then stores them. More specifically, the register numbers are held as pointers of an array, and label numbers are listed in the array, and the label numbers are their own addresses. Thereby, the label numbers are connected to the register numbers.

The address list control circuit 146 controls writing, reading and the like of information in the address list 143.

The label memory controller 147 controls writing, reading and the like of the additional information in the additional information memory 148, and outputs the above-described label information about the whole picked-up image, and the above-described position information and the above-described area information for each connected region as label information Dout.

Figure 6:
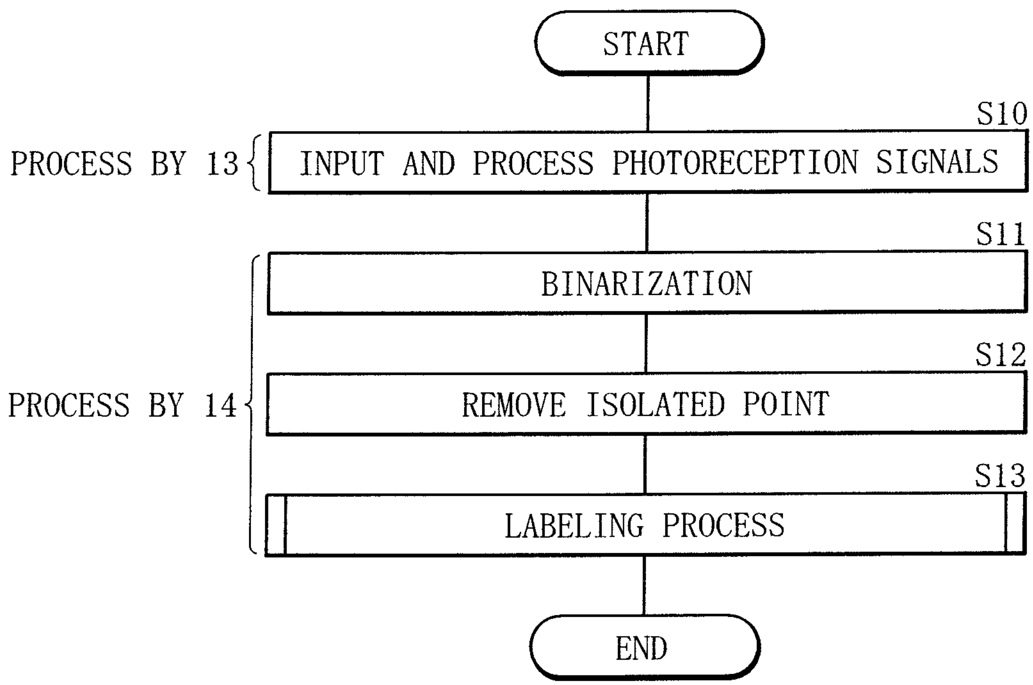
FIG. 6 is a flow chart of the whole image processing by an image input/output device.
Figure 7:
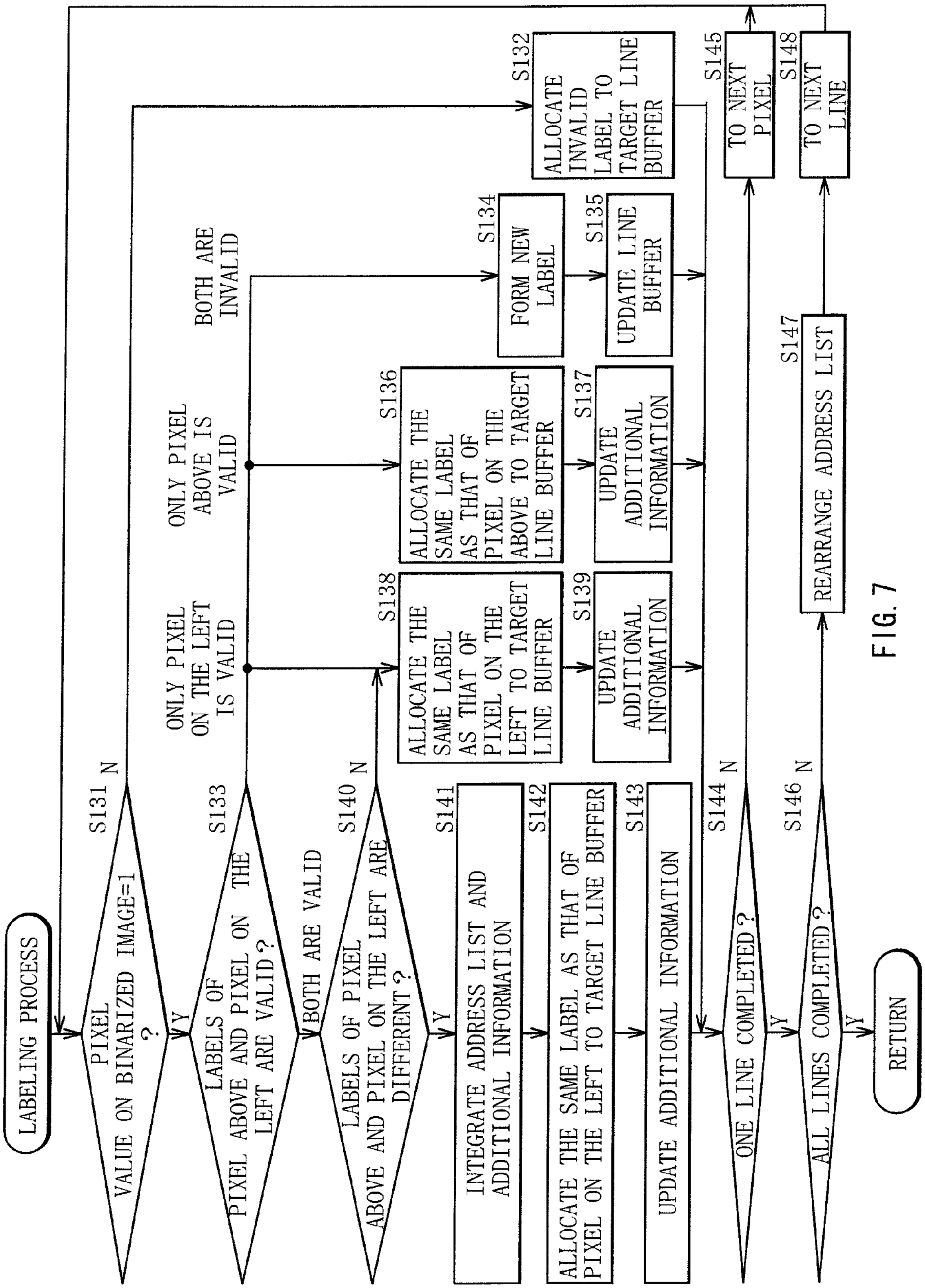
FIG. 7 is a flow chart illustrating the details of the labeling process of the first embodiment.

Next, referring to FIGS. 6 to 23 in addition to FIGS. 1 to 5, functions of the image input/output device 1 of the embodiment will be described below. FIG. 6 illustrates a flow of the whole image processing by the image input/output device 1. Moreover, FIG. 7 illustrates a flow chart of details of the labeling process of the embodiment. Further, FIGS. 8 to 23 schematically illustrate details of the labeling process of the embodiment.

First, referring to FIG. 6, a basic operation of the image input/output device 1 will be described below.

Display data outputted from the electronic device body 20 is inputted into the display signal processing section 12. The display signal processing section 12 drives the input/output panel 11 so as to display an image on the input/output panel 11 based on the display data.

While the input/output panel 11 displays an image on the display elements 11*a* through the use of light emitted from the backlight, the input/output panel 11 drives the photoreception elements 11*b*. Then, when the external proximity object such as a finger touches or comes close to the display elements 11*a*, an image displayed on the display elements 11*a* is reflected from the external proximity object, and reflected light is detected by the photoreception elements 11*b*. By the detection, the photoreception signals are outputted from the photoreception elements 11*b*. Then, the photoreception signals are inputted into the photoreception signal processing section 13, and the photoreception signal processing section 13 performs a process such as amplification to process the photoreception signals (step S10 in FIG. 6). Thus, a picked-up image is obtained in the photoreception signal processing section 13.

Next, the picked-up image is inputted from the photoreception signal processing section 13 to the image processing section 14, and the image processing section 14 performs a binarization process on the picked-up image (step S11). In other words, the image processing section 14 stores a preset threshold value, and performs the binarization process in which the signal intensity of picked-up image data is set to "0" or "1" depending on whether the signal intensity of the picked-up image data is smaller than the threshold value, or equal to or larger than the threshold value. Thereby, a part where light reflected from the external proximity object is received is set to "1", and the other part is set to "0".

Then, the image processing section 14 removes an isolated point from the binarized picked-up image (step S12). In other words, the image processing section 14 performs noise removal by removing a part set to "1" isolated from the external proximity object in the case where the picked-up image is binarized in the above-described manner.

After that, the image processing section 14 performs a labeling process in the labeling processing section 14*a* (step S13). In other words, the labeling processing section 14*a* performs a labeling process on the part set to "1" in the case where the picked-up image is binarized in the above-described manner. Then, the labeling processing section 14*a* detects a region set to "1" as a region of the external proximity object, and obtains the barycenter or the central coordinates of the region. Such data is outputted to the control section 21 as point information (the above-described label information Dout).

Next, the control section 21 performs a necessary process such as changing a display image through the use of the point information inputted from the image processing section 14. For example, if an operation menu is displayed on a screen, which button in the operation menu is selected by a finger of a user is detected, and a command corresponding to the selected button is executed. Thus, the basic operation in the image input/output device 1 is completed.

Next, referring to FIGS. 7 to 23, the labeling process by the labeling processing section 14*a* as one of characteristic parts of the invention will be described in detail below.

First, for example, as illustrated in FIG. 8, the values of the line buffer 144, the address list 143 and the additional information memory 148 are initialized. Then, first, the condition determining circuit 141 determines whether or not the pixel value (pixel data) of a target pixel is “1” (a valid value) in a picked-up image configured of binarized data Din (step S131 in FIG. 7).

In this case, for example, as illustrated in FIG. 9, in the case where the pixel data of the target pixel is “0” (an invalid value) (step S131: N), the line buffer control circuit 145 and the address list control circuit 146 each do not issue and allocate label information to the target pixel. In other words, for example, as illustrated in FIG. 10, “z” (an invalid label) is allocated to the target pixel in the line buffer 144 and the address list 143 (step S132). Then, after that, the condition determining circuit 141 determines whether or not scanning along one line is completed (whether or not the target pixel is located at the right end of one line) (step S144).

In this case, in the case where scanning along one line is not yet completed (step S144: N), for example, as illustrated in FIG. 11, the target pixel is shifted to the next pixel (a pixel on the right) in the line (sequential scanning is performed) (step S145). Then, the labeling process returns to the step S131.

Figure 13:
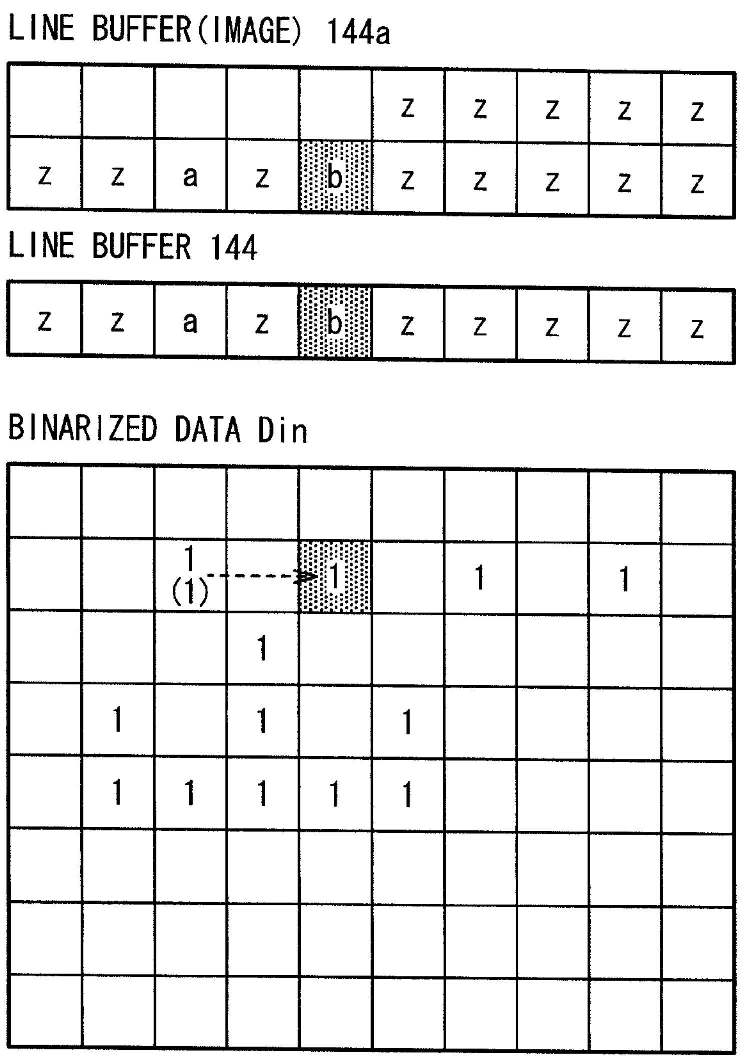
FIG. 13 is a schematic view for describing the details of the labeling process following FIG. 12.

In this case, for example, as illustrated in FIG. 11, in the case where the pixel data of the target pixel is “1” (an valid value) (step S131: Y), next, the condition determining circuit 141 determines whether labels of neighboring pixels around the target pixel (in this case, a pixel above the target pixel and a pixel on the left of the target pixel) are valid or invalid (whether the pixel data of the neighboring pixels have valid values or invalid values, and whether or not the target pixel is an isolated point) (step S133). In this case, as illustrated in FIG. 11, the labels of the pixel above the target pixel and the pixel on the left of the target pixel are invalid (the pixel data are “0” (invalid values), and the target pixel is an isolated point) (step S133: both are invalid); therefore, for example, as illustrated in FIG. 12, the new label number issuing circuit 142 issues and allocates a new label (new label information) to the target pixel (step S134). Moreover, in addition to this, for example, as illustrated in FIG. 12, each of the line buffer control circuit 145, the address list control circuit 146 and the label memory controller 147 also updates additional information (step S135). After that, in this case, for example, as illustrated in FIG. 13, processes in the steps S144 and S145 are repeated. In addition, “(1)” or the like illustrated in a pixel in the binarized data Din in FIG. 13 and the like means a register number (label information) allocated to the pixel.

Next, for example, as illustrated in FIG. 14, processes in the steps S131, S132, S144 and S145 or processes in the steps S131, S134, S135, S144 and S145 are repeated. Then, in the case where it is determined that scanning along one line is completed (step S144: Y), next, the condition determining circuit 141 determines whether or not scanning along all lines in the picked-up image is completed (step S146).

Now, as illustrated in FIG. 14, in the case where scanning along all lines are not yet completed (step S146: N), next, the address list on completion of scanning along one line is rearranged (step S147), and, for example, as illustrated in FIG. 15, a target pixel is shifted to a first pixel (a pixel at a left end) in the next line (sequential scanning is performed) (step S148). However, in this case (in the case illustrated in FIG. 14), the address list is not rearranged, so rearrangement of the address list will be described later. In addition, after that, the labeling process returns to the step S131.

On the other hand, for example, as illustrated in FIG. 16, the address list control circuit 146 performs the rearrangement of the address list which will be described below (step S147). More specifically, for example, as illustrated in FIG. 17, in the address list 143, the flag of a register number which is not present in the line buffer 144 is set to “0” (indicating that label information corresponding to the register number is not allocated). Thereby, for example, as illustrated in FIG. 18, after that, a register number of which the flag is “0” in the address list 143 is allowed to be reused (label information is allowed to be reused). In addition, after that, as illustrated in FIG. 18, a target pixel is shifted to a first pixel in the next line (step S148), and the labeling process returns to the step S131.

Next, for example, as illustrated in FIG. 19, in the case where it is determined that in the step S131, the pixel data of the target pixel is “1” (a valid value) (step S131: Y) and it is determined that in the step S133, only the label of a pixel above the target pixel is valid (the pixel data is “1” (a valid value)) (step S133: only the pixel above is valid), processes in steps S136 and 137 which will be described below are performed. In other words, for example, as illustrated in FIG. 19, the same label as that of the pixel above the target pixel is allocated to the target pixel (issued label information having already allocated to a pixel having a valid value is allocated to the target pixel) (step S136), and additional information (position information and area information for each connected region) is updated (step S137).

On the other hand, in the case where it is determined that in the step S131, the pixel data of the target pixel is “1” (step S131: Y) and it is determined that in the step S133, only the label of a pixel on the left of the target pixel is valid (step S133: only the pixel on the left is valid), processes in steps S138 and S139 which will be described below are performed. In other words, the same label as that of the pixel on the left is allocated to the target pixel (step S138), and additional information is updated (step S139).

Moreover, for example, as illustrated in FIG. 20, in the case where it is determined that in the step S131, the pixel data of the target pixel is “1” (step S131: Y) and it is determined that in the step S133, the labels of the pixels above the target pixel and the pixel on the left of the target pixel both are valid (step S133: both are valid), next, the condition determining circuit 141 determines whether or not the labels of the pixel above the target pixel and the pixel on the left of the target pixel are different from each other (step S140). In this case, in the case where the labels of the pixel above the target pixel and the pixel on the left of the target pixel are the same as each other (step S140: N), the above-described processes in the steps S138 and S139 are performed.

Figure 21:
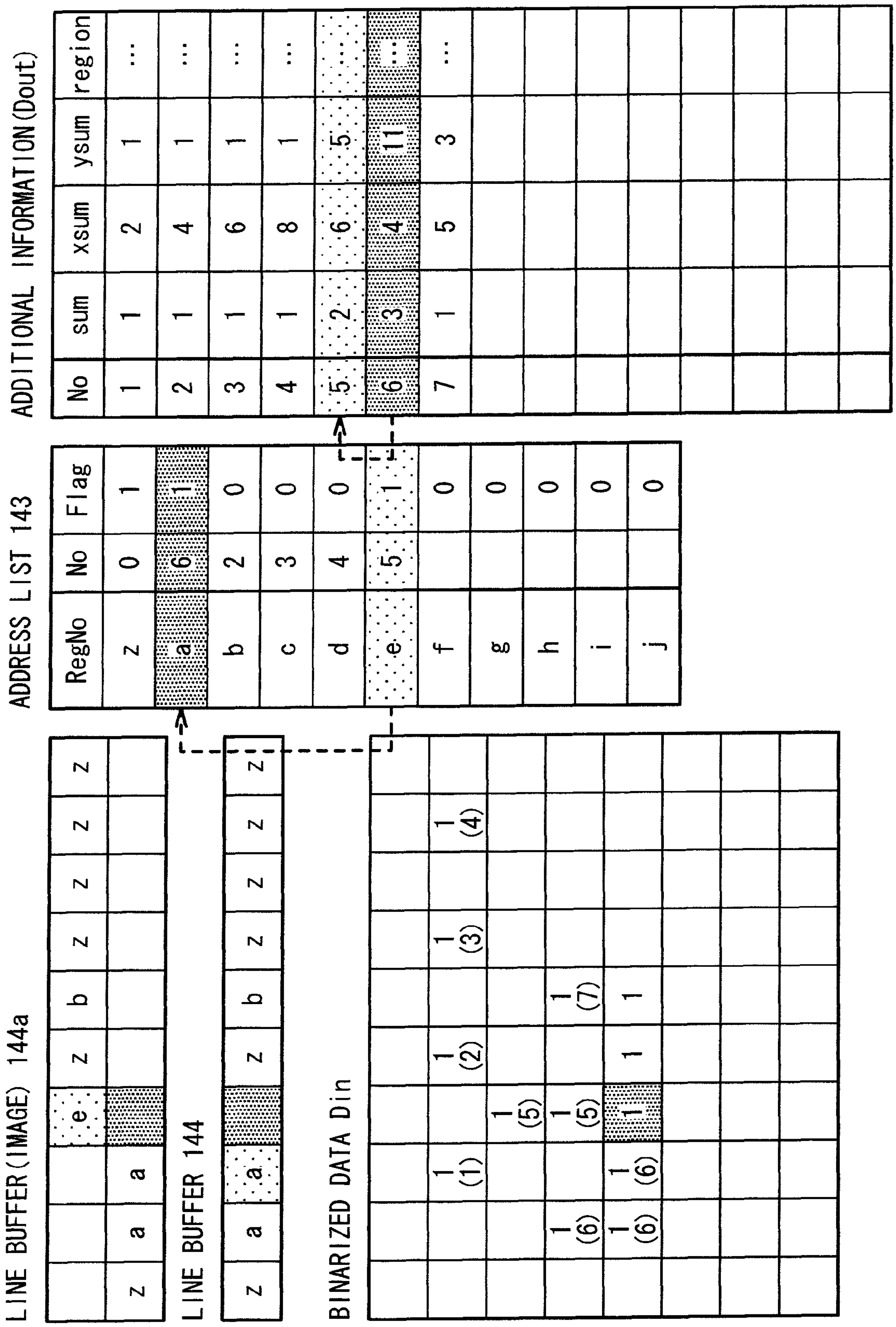
FIG. 21 is a schematic view for describing the details of the labeling process following FIG. 20.

On the other hand, in the case where it is determined that the labels of the pixel above the target pixel and the pixel on the left of the target pixel are different from each other in the step S140 (step S140: Y), an address list integration process which will be described below (step S141) is performed, and the same label as that of one of the pixel above the target pixel and the pixel on the left of the target pixel is allocated (step S142), and additional information is updated (step S143). More specifically, for example, as illustrated in FIGS. 21 and 22, the line buffer control circuit 145, the address list control circuit 146 and the label memory controller 147 each select the register number (RegNo; corresponding to label information) of the pixel on the left of the target pixel from the pixel above the target pixel and the pixel on the left of the target pixel, and additional information is integrated to a smaller label number (No; corresponding to an address, number).

Thereby, two connected regions are integrated, and the same label is allocated to pixels in the two connected regions which are integrated.

Thus, when the labeling process indicated by the steps S131 to 148 is performed, for example, as illustrated in FIG. 23, label information about the whole picked-up image, and position information and area information for each connected region are obtained as the label information Dout. Then, in the case where it is determined that scanning along all lines is completed in the step S146 (step S146: Y), the labeling process is completed.

In the labeling process of the embodiment, sequential scanning is performed on pixels in the picked-up image represented by the binarized data Din in such a manner. Then, during the sequential scanning, while a register number is, as occasion arises, allocated to a target pixel based on the values of pixel data of the target pixel and neighboring pixels thereof, additional information (position information and area information) for each connected region corresponding to each label information is updated as occasion arises. Thereby, acquisition of label information about the whole picked-up image, and position information and area information for each connected region is completed on completion of the sequential scanning. In other words, unlike related art, it is not necessary to form a labeling image, and labeling information and the like about the whole image is obtained by one sequential scanning process.

Thus, in the embodiment, sequential scanning is performed on pixels in the picked-up image represented by the binarized data Din, and during the sequential scanning, while a register number (label information) representing an identification number of each connected region in the picked-up image is, as occasion arises, allocated to the target pixel based on the values of the pixel data of the target pixel and neighboring pixels thereof, additional information (position information and area information) for each connected region corresponding to each label information is updated as occasion arises, so label information, position information and area information are obtainable by one sequential scanning process. Therefore, a higher speed of a labeling process than ever before is achievable.

Moreover, a high-speed labeling process is achieved, so compared to related art, real time capability of the labeling process is allowed to be improved, and a streaming process is achievable.

Further, unlike related art, it is not necessary to form a labeling image, so a frame memory for holding such an image is also not necessary. In other words, in the embodiment, the labeling process is performed using the line buffer, so compared to related art, a used memory amount is allowed to be reduced. Therefore, the labeling process is easily achieved on hardware.

Second Embodiment

Next, a second embodiment of the invention will be described below. An image input/output device of the embodiment is the same as the image input/output device 1 of the first embodiment illustrated in FIG. 1, except that a labeling process section 14*b* is arranged instead of the labeling process section 14*a*. In addition, like components are denoted by like numerals as of the first embodiment and will not be further described.

Figure 24:
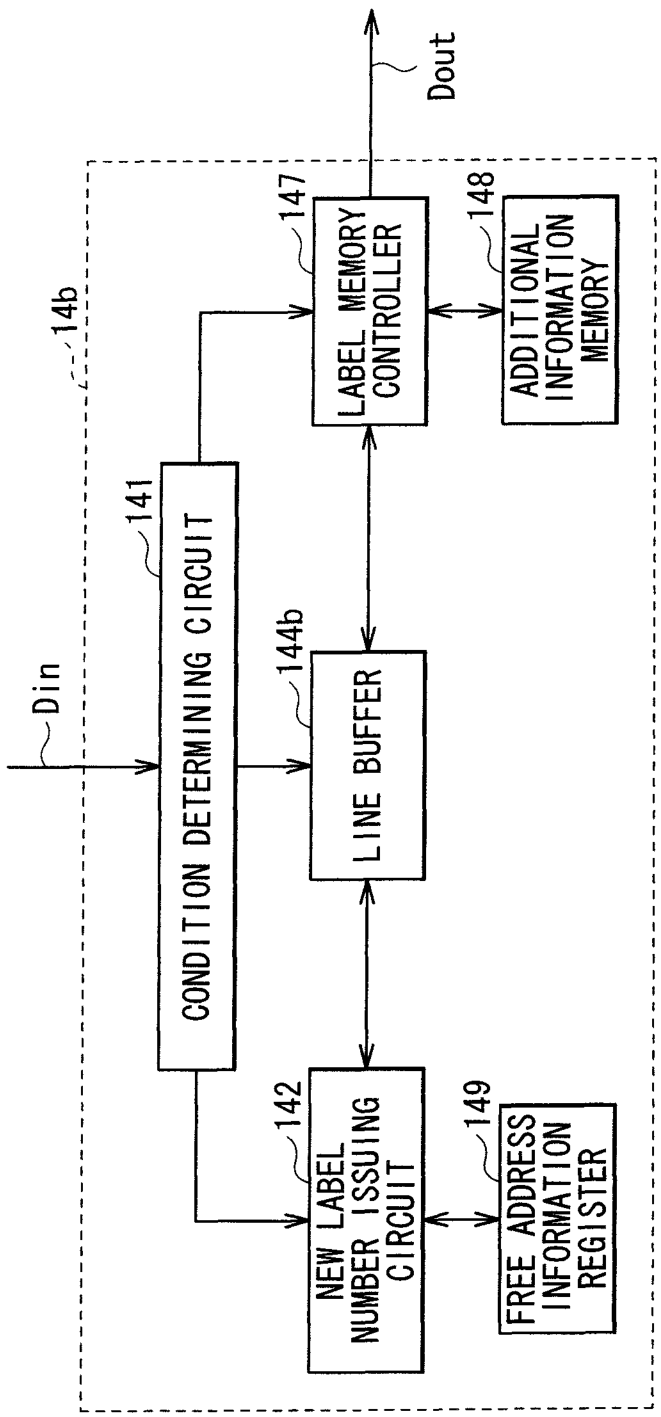
FIG. 24 is a block diagram illustrating a specific configuration of a labeling process section according to a second embodiment.

FIG. 24 illustrates a block diagram of the labeling process section 14*b* of the embodiment. The labeling process section 14*b* includes the condition determining circuit 141, the new label number issuing circuit 142, a line buffer 144*b*, the label memory controller 147, the additional information memory 148 and a free address information register 149. In other words, the labeling process section 14*b* is the same as the labeling process section 14*a* of the first embodiment illustrated in FIG. 4, except that the free address information register 149 is arranged instead of the address list 143 and the address list control circuit 146, and the line buffer 144*b* is arranged instead of the line buffer 144 and the line buffer control circuit 145.

Figure 25:
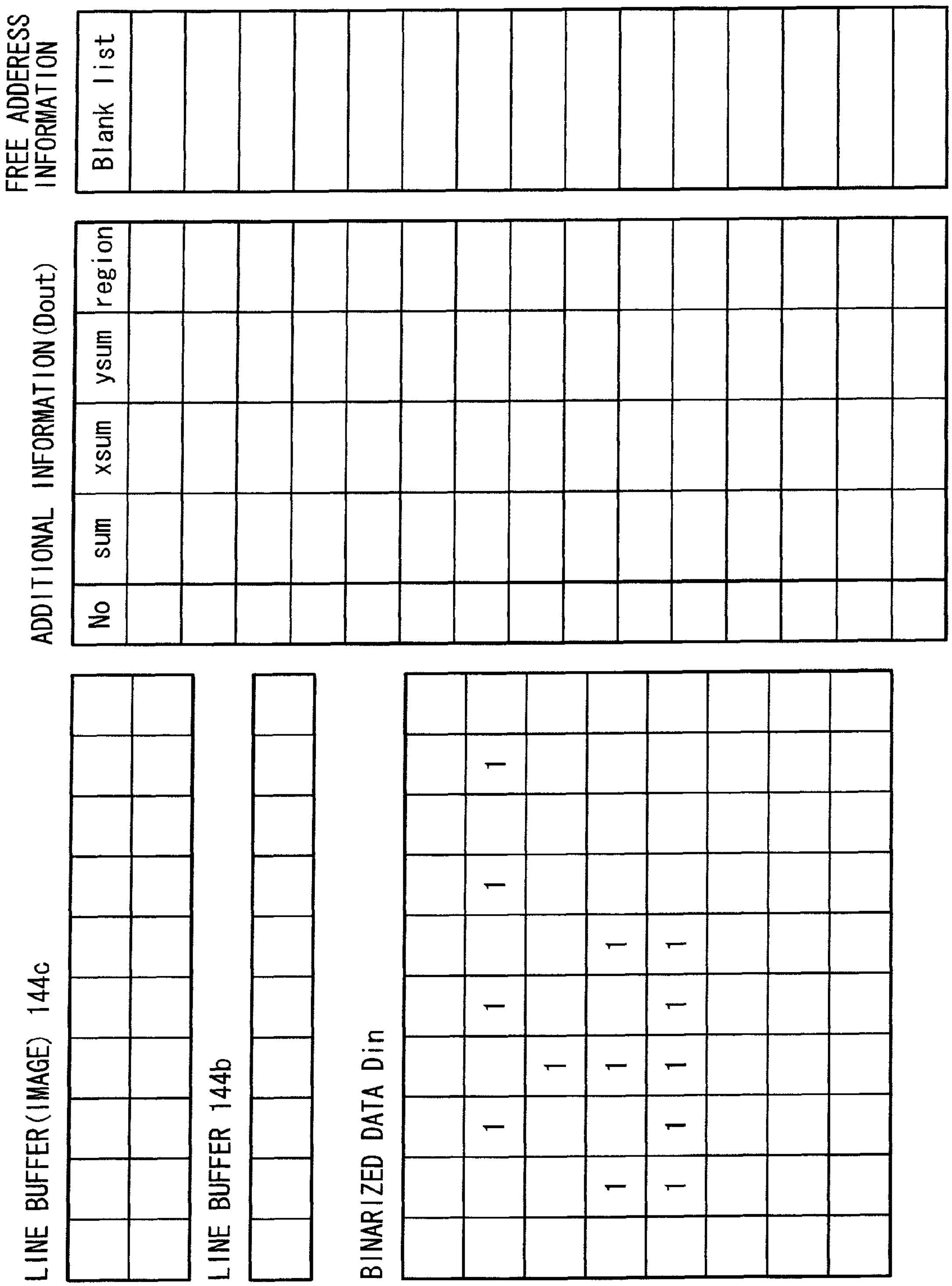
FIG. 25 is a schematic view illustrating an example of binarized data, a line buffer, additional information and free address information used in a labeling process of the second embodiment.

For example, as illustrated in FIG. 25, the line buffer 144*b* is a section storing one line of label numbers (corresponding to label information). Moreover, the line buffer 144*b* is configured of a controller for each pixel, thereby reference, writing, updating and the like of label numbers of a target pixel and neighboring pixels thereof (in this case, a pixel above the target pixel and a pixel on the left of the target pixel) are allowed. In addition, a line buffer (image) 144*c* illustrated in FIG. 25 or the like is illustrated for the sake of convenience to describe a labeling process which will be described later, and the actual line buffer 144*b* is a buffer containing one line.

For example, as illustrated in FIG. 25, the free address information register 149 stores a state whether or not each label number is allocated (Blank list). The free address information register 149 performs the control of label numbers which are in use or unused, searching of a new label number and the like together with the new label number issuing circuit 142. More specifically, a newly issued label number and a label number erased by integration are rewritten as a number in use and an unused number, respectively. Thereby, a used label number is allowed to be reused over and over again. In addition, label numbers are used in ascending numeric order.

Moreover, the additional information memory 148 of the embodiment associates, for example, additional information illustrated in FIG. 25, that is, the above-described label numbers (No), and position information (xsum, ysum, region) and area information (sum) for each connected region corresponding to each label information with each other, and then stores them. Moreover, in the case where the label number is updated on a current label (of a target pixel) being accessed by the label memory controller 147, and in the case where the number is changed, or on the completion of scanning along one line, writing to the additional information memory 148 is performed.

Figure 26:
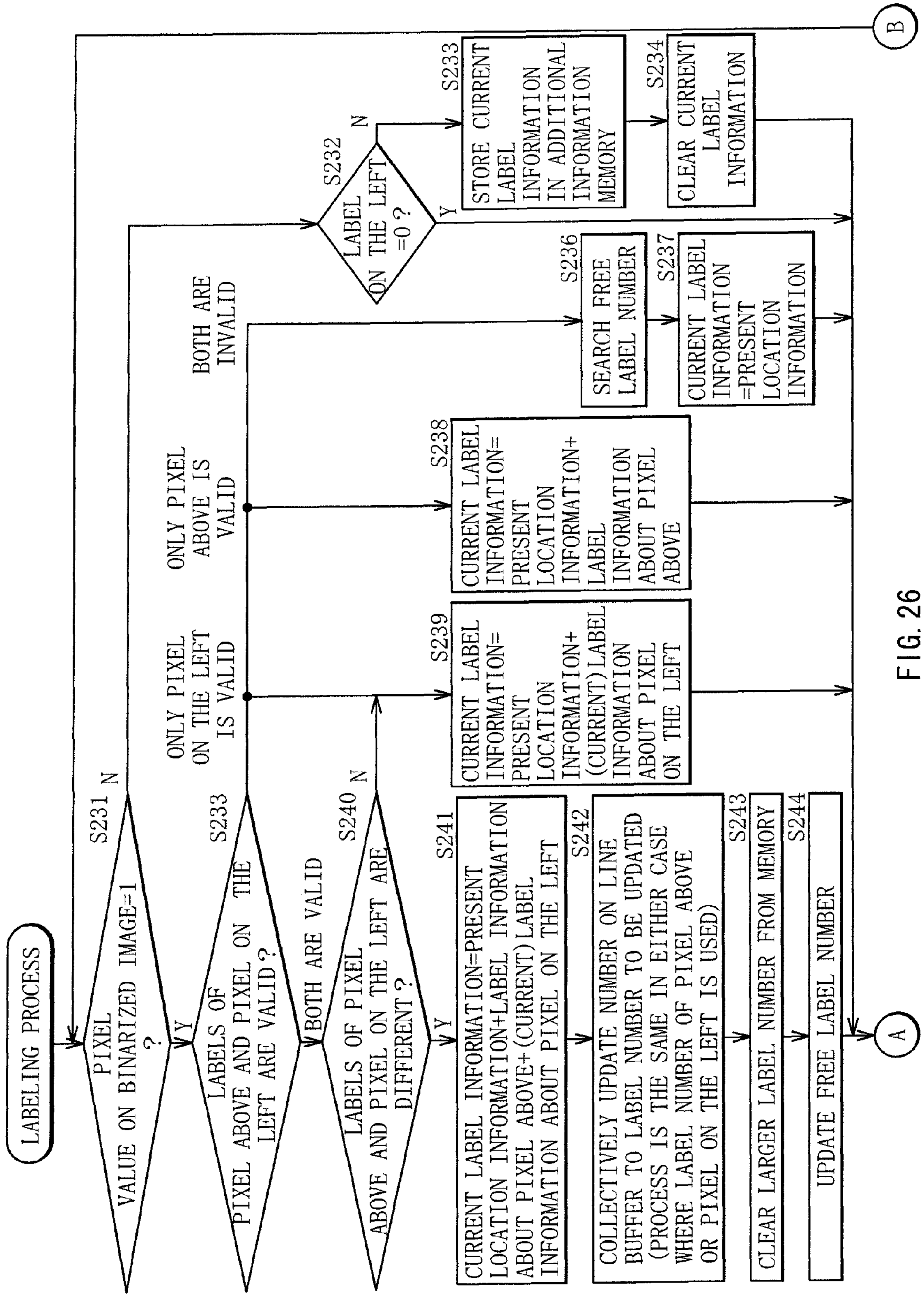
FIG. 26 is a flow chart illustrating details of the labeling process of the second embodiment.
Figure 27:
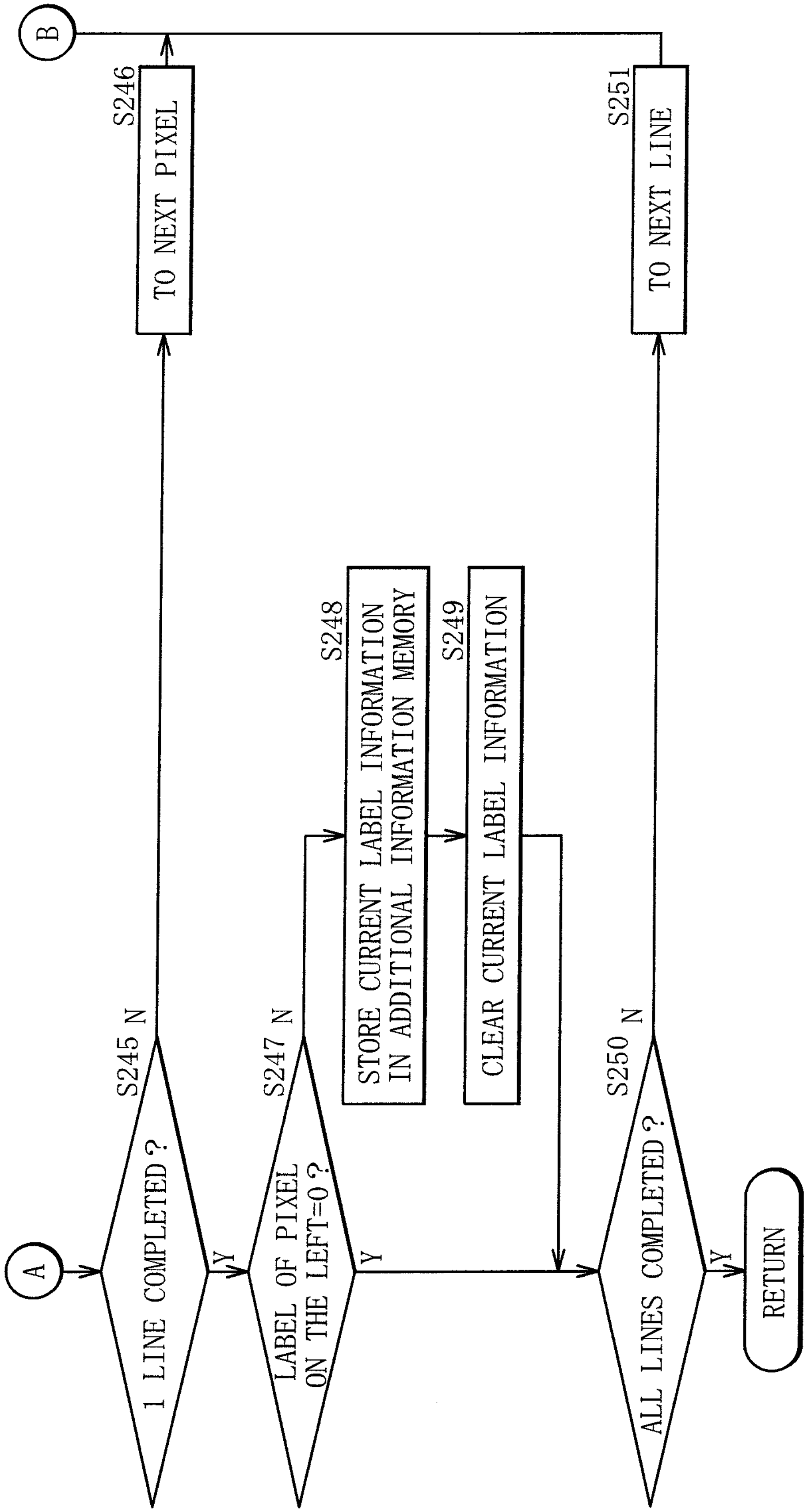
FIG. 27 is a flow chart illustrating the details of the labeling process of the second embodiment following FIG. 26.

Next, referring to FIGS. 26 to 37 in addition to FIGS. 24 and 25, functions of the image input/output device of the embodiment will be described below. FIGS. 26 and 27 illustrate flow charts of details of the labeling process of the embodiment. Moreover, FIGS. 28 to 37 schematically illustrate details of the labeling process of the embodiment. In addition, the basic operation of the image input/output device is the same as that of the first embodiment, and will not be further described.

First, for example, as illustrated in FIG. 28, values of the line buffer 144*b*, the additional information memory 148 and the free address information register 149 are initialized. Then, first, the condition determining circuit 141 determines whether or not the pixel value (pixel data) of the target pixel is “1” (a valid value) in a picked-up image configured of binarized data Din (step S231 in FIG. 26).

In this case, for example, as illustrated in FIG. 29, in the case where the pixel data of the target pixel is “0” (an invalid value) (step S231: N), label information is not issued and allocated to the target pixel. More specifically, next, the condition determining circuit 141 determines whether or not the label of a pixel on the left of the target pixel is “0” (step S232). In this case, the label of the pixel on the left is not “0” (step S232: N), so the line buffer 144*b* and the label memory controller 147 perform the following processes in steps S233 and S234, respectively. In other words, as illustrated in FIG. 29, current label information "0" is stored in the additional information memory 148 (step S233), and the current label information is erased from the label memory controller 147 (step S234), and then the labeling process proceeds to a step S245. In addition, in the case where the label of the pixel on the left of the target pixel is "0" (step S232: Y), the labeling process proceeds to a step S245 directly. In the step S245, the condition determining circuit 141 determines whether or not scanning along one line is completed (whether or not the target pixel is located at the right end) (step S245 in FIG. 27).

In this case, in the case where scanning along one line is not yet completed (step S245: N), for example, as illustrated in FIG. 30, the target pixel is shifted to the next pixel (a pixel on the right) in the line (sequential scanning is performed) (step S246). Then, next, the labeling process returns to the step S231.

On the other hand, in the case where it is determined that scanning along one line is completed (step S245: Y), next, the condition determining circuit 141 determines whether or not the label of the pixel on the left of the target pixel is "0" (step S247). In this case, the label of the pixel on the left of the target pixel is "0" (step S232: Y), next, the labeling process proceeds to a step S250. In addition, in the case where the label of the pixel on the left of the target pixel is "1" (step S247: N), the line buffer 144*b* and the label memory controller 147 performs the following processes in steps S248 and S249, respectively. In other words, current label information "0" is stored in the additional information memory 148 (step S248), and current label information is erased from the label memory controller 147 (step S249), and then the labeling process proceeds to the step S250.

In the step S250, the condition determining circuit 141 determines whether or not scanning along all lines in the picked-up image is completed (step S250). In this case, scanning along all lines is not yet completed (step S250: N), for example, as illustrated in FIG. 30, the target pixel is shifted to a pixel in the next line (sequential scanning is performed) (step S251), and then the labeling process returns to the step S231. At this time, in the embodiment, the address list 143 is not arranged, so unlike the first embodiment, addresses are not rearranged.

On the other hand, for example, as illustrated in FIG. 30, in the case where the pixel data of the target pixel is "1" (a valid value) (step S231: Y), next, the condition determining circuit 141 determines whether labels of neighboring pixels around the target pixel (in this case, a pixel above the target pixel and a pixel on the left of the target pixel) are valid or invalid (whether the pixel data of the neighboring pixels have valid values or invalid values, and whether or not the target pixel is an isolated point) (step S235). In this case, as illustrated in FIG. 30, as the labels of the pixel above the target pixel and the pixel on the left of the target pixel are invalid (the pixel data are "0" (an invalid value), and the target pixel is an isolated point) (step S235: both are invalid), for example, as illustrated in FIG. 30, the new label number issuing circuit 142 searches a free label number through the use of the free address information register 149 (step S236). Moreover, in addition to this, for example, as illustrated in FIG. 30, the line buffer 144*b* and the label memory controller 147 use present location information as current label information so as to allocate a new label (new label information) to the target pixel (step S237). In addition, after that, in this case, for example, as illustrated in FIG. 31, processes in the steps S245 and S246 are repeated. In addition, "(1)" or the like illustrated in a pixel in the binarized data Din in FIG. 31 and the like means a label number (label information) allocated to the pixel.

Figure 32:
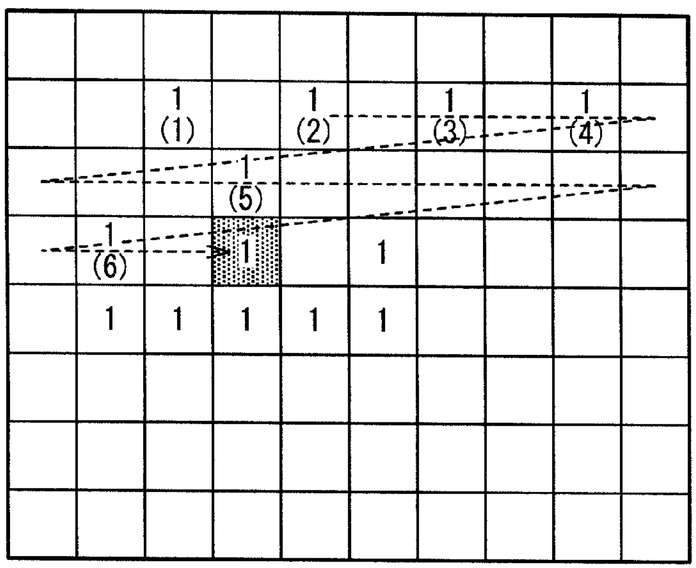
FIG. 32 is a schematic view for describing the details of the labeling process following FIG. 31.

Next, for example, as illustrated in FIG. 32, in this case, processes in the steps S231, S232 to S234, S245 and S246 or processes in the steps S231, S235, S236, S237, S245 and S246 are repeated.

Next, for example, as illustrated in FIG. 32, in the case where in the step S321, it is determined that the pixel data of the target pixel is "1" (a valid value) (step S231: Y), and in the step S235, it is determined that only the label of the pixel above the target pixel is valid (the pixel data is "1" (a valid value)) (step S235: only the pixel above is valid), a process in step S238 which will be described later is performed. In other words, for example, as illustrated in FIG. 32, the line buffer 144*b* and the label memory controller 147 use (present location information+label information about the pixel above the target pixel) as current label information, thereby the same label as that of the pixel above the target pixel is allocated to the target pixel. Thereby, for example, as illustrated in FIG. 33, additional information (position information and area information for each connected region) is updated.

Figure 34:
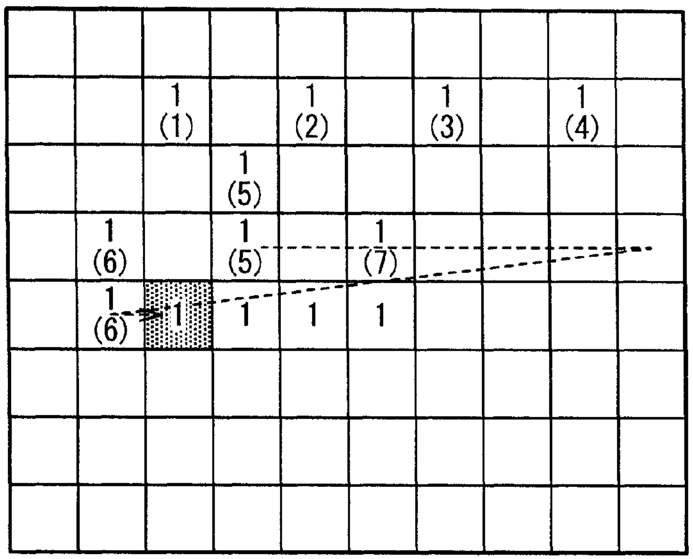
FIG. 34 is a schematic view for describing the details of the labeling process following FIG. 33.

On the other hand, for example, as illustrated in FIG. 34, in the case where it is determined that in the step S231, the pixel data of the target pixel is "1" (step S231: Y), and it is determined that in the step S235, only the label of the pixel on the left of the target pixel is valid (step S235: the pixel on the left is valid), a process in step S239 which will be described below is performed. In other words, for example, as illustrated in FIG. 34, (present location information+label information on the pixel on the left of the target pixel) is used as current label information, thereby the same label as that of the pixel on the left of the target pixel is allocated to the target pixel.

Moreover, for example, as illustrated in FIG. 35, in the case where it is determined that in step S231, the pixel data of the target pixel is "1" (step S231: Y), and it is determined that in the step S235, the labels of the pixel above the target pixel and the pixel on the left of the target pixel are valid (step S235: both are valid), next, the condition determining circuit 141 determines whether or not the labels of the pixel above the target pixel and the pixel on the left of the target pixel are different from each other (step S240). In this case, in the case where the labels of the pixel above the target pixel and the pixel on the left of the target pixel are the same as each other (step S240: N), the above-described process in the step S239 is performed.

On the other hand, in the case where it is determined that the labels of the pixel above the target pixel and the pixel on the left of the target pixel are different from each other in the step S240 (step S240: Y), processes in steps 241 to S244 which will be described below are performed, and the same label as that of one pixel selected from the pixel above the target pixel and the pixel on the left of the target pixel is allocated to the target pixel, and additional information is updated. More specifically, for example, as illustrated in FIG. 35, the line buffer 144*b* and the label memory controller 147 each use (present location information+label information about the pixel above the target pixel+label information about the pixel on the left of the target pixel) as current label information (step S241). Moreover, in addition to this, for example, as illustrated in FIG. 35, the label numbers on the line buffer 144*b* are collectively updated to a label number to be updated (step S242). Then, a larger label number from the label numbers of the pixel above the target pixel and the pixel on the left of the target pixel is erased from the additional information memory 148 (step S243), and free address information (a free label number) is updated (step S244). Thereby, for example, as illustrated in FIG. 36, two connected regions are integrated, and the same label is allocated to pixels in the two connected regions which are integrated.

The labeling process represented by the steps S231 to 251 is performed in such a manner, thereby, for example, as illustrated in FIG. 37, label information about the whole picked-up image, and position information and area information for each connected region are obtained as label information Dout. Then, in the case where it is determined that scanning along all lines is completed in the step S250 (step S250: Y), the labeling process is completed.

In this case, also in the labeling process of the embodiment, as in the case of the first embodiment, sequential scanning is performed on pixels in the picked-up image represented by the binarized data Din. Then, during the sequential scanning, while a label number is, as occasion arises, allocated to a target pixel based on the values of pixel data of the target pixel and neighboring pixels thereof, additional information (position information and area information) for each connected region corresponding to each label information is updated as occasion arises. Thereby, acquisition of label information about the whole picked-up image, and position information and area information for each connected region is completed on completion of such sequential scanning. In other words, unlike related art, it is not necessary to form a labeling image, and labeling information and the like about the whole image is obtained by one sequential scanning process.

Thus, also in the embodiment, the same effects as those in the first embodiment are obtainable by the same functions as those in the first embodiment. In other words, label information, position information and area information about the whole picked-up image are obtainable by one sequential scanning process. Therefore, a higher speed of the labeling process than ever before is achievable.

Moreover, in the embodiment, the address list 143 in the first embodiment is not necessary, and label information is allowed to be directly updated, so compared to the first embodiment, real-time capability is further improved. Therefore, the labeling process on hardware is achieved more easily, and a used memory amount is allowed to be reduced.

Although the present invention is described referring to the first and second embodiments, the invention is not limited thereto, and may be variously modified.

For example, in the above-described embodiments, the case where as the neighboring pixels, pixels in two directions, that is, above the target pixel and on the left of the target pixel are used to perform the labeling process is descried; however, for example, the labeling process may be performed using pixels in three directions, that is, above the target pixel, on the left of the target pixel and at the upper right from the target pixel as the neighboring pixels.

Moreover, in the above-described embodiment, the case where as the value of the pixel data, "1" is a valid value, and "0" is an invalid value is described; however, on the contrary, as the value of the pixel data, "0" may be a valid value, and "1" may be an invalid value.

Further, in an example illustrated in FIGS. 2 and 3, one light reception cell is arranged corresponding to one light emission cell; however, one light reception cell may be arranged corresponding to a plurality of light emission cells.

Moreover, in the image input/output devices 1 and 2 described in the above-described embodiments, as the input/output panel 11, a configuration using the liquid crystal display panel is described. However, the information input/output device of the invention may have a configuration using an organic electroluminescence (EL) panel or the like as the input/output panel. An organic EL element has characteristics of, when a forward bias voltage is applied, emitting light, and, when a backward bias voltage is applied, receiving light to generate a current. Therefore, the organic EL element includes a display element 11*a* and a photoreception element 11*b*. In this case, the input/output panel 11 is configured by arranging the organic EL element for each pixel, and when the forward bias voltage is applied to each organic EL element, thereby each organic EL element is allowed to emit light, an image is displayed, and when the backward bias voltage is applied to other organic EL elements, the organic EL elements are allowed to receive reflected light.

Further, in the above-described embodiments, the invention is described referring to the image input/output device 1 which includes the input/output panel 11 including a plurality of display elements 11*a* and a plurality of photoreception elements 11*b* as an example; however, the invention is applicable to an image input device (an image pickup device) which includes an input panel including a plurality of photoreception elements 11*b*.

Figure 38:
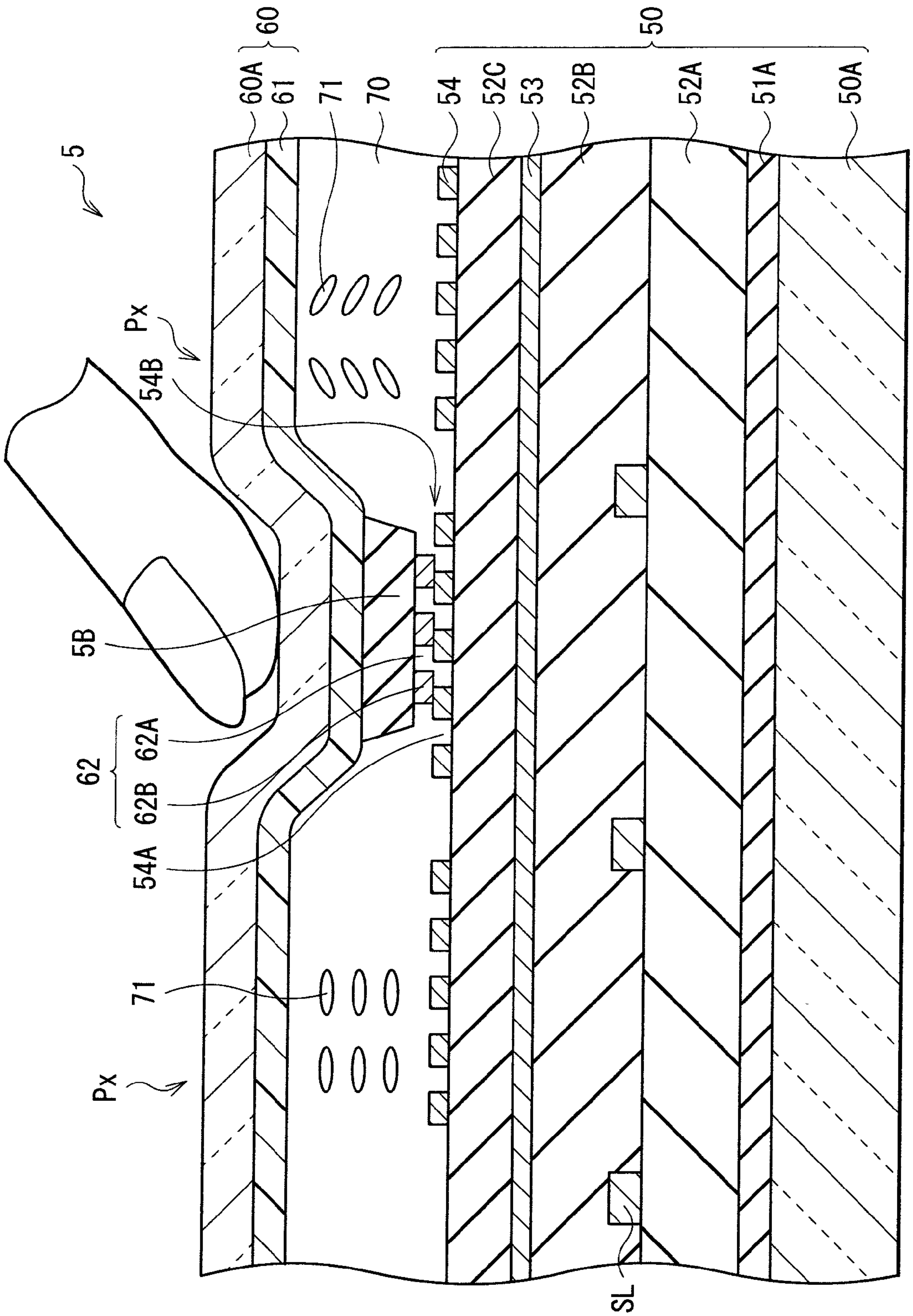
FIG. 38 is a sectional view illustrating a configuration of an input/output panel according to a modification example of the invention.

Moreover, the image processing apparatus of the invention is applicable to not only a picked-up image based on photoreception signals obtained by the photoreception elements 11*b* but also an image produced by any other technique. More specifically, the image processing apparatus of the invention is applicable to, for example, an image produced in an image input/output device including an input/output panel 5 (with a sectional configuration in a pixel Px) illustrated in FIG. 38. The input/output panel 5 includes a first substrate 50 including a glass substrate 50A, a gate insulating film 51A, a first interlayer insulating film 12A, a signal line SL, a second interlayer insulating film 52B, a common electrode 53, a third interlayer insulating film 52C and a pixel electrode 54 (a first sensor electrode), and a second substrate 60 including a glass substrate 60A, a color filter 61 and an opposed sensor electrode 62 (a second sensor electrode), and a liquid crystal layer 70 including liquid crystal molecules 71. In other words, in the input/output panel 5, a resistance type touch sensor is configured of the pixel electrode 54 and the opposed sensor electrode 62. In this case, the pixel electrode 54 has, for example, a sectional shape including a plurality of edges 54B. An alignment film (not illustrated) on the edges 54B tends to be thin, and the edges 54B are exposed from the alignment film. Moreover, the opposed sensor electrode 62 (configured of a slit 62A and a pattern 62B) is arranged opposed to the edges 54B. Thereby, when the second substrate 60 is bent, the opposed sensor electrode 62 touches the exposed edges 54B of the pixel electrode 54 so as to directly bring into conduction, so instability of position detection is prevented. In particular, in the case where the input/output panel 5 is an FFS (Fringe Field Switching) system liquid crystal display panel, the pixel electrode 54 originally has a planar shape including a plurality of slits 54A, so position detection performance is allowed to be enhanced without reducing an aperture ratio.

Further, the processes described in the above-described embodiments may be performed by hardware or software. In the case where the processes are performed by software, a program forming the software is installed in a general-purpose computer or the like. Such a program may be stored in a recording medium mounted in the computer in advance.

The invention claimed is:

1. An image display and data processing apparatus comprising:

a scanning section configured to perform sequential scanning on pixels in an image having binarized pixel data; and an information obtaining section configured to dynamically allocate label information to a target pixel, the label information identifying a connected pixel region in the image, and also dynamically update position information and area information of the connected pixel region identified by the label information, depending on values of the pixel data of the target pixel and neighboring pixels thereof during the sequential scanning, so that the label information, the position information and the area information can be obtained for the image entirely on completion of the sequential scanning, wherein the information obtaining section includes a determining section configured to determine whether or not to allocate the label information to the target pixel and whether or not to update the position information and the area information of the connected region, depending on values of the pixel data of the target value and neighboring pixels thereof, a label issuing section configured to issue new label information on the basis of a determination result of the determining section, a line buffer configured to store the label information therein, an additional information memory configured to store the position information and the area information associated with an address number respectively, and an address list configured to store (i) the label information stored in the line buffer, (ii) the address number stored in the additional information memory, and (iii) whether the label information is allocated to any pixel, in a manner such that the label information, address number and label allocation information are associated with each other.

2. The image display and data processing apparatus according to claim 1, wherein in the case where a target pixel has a valid value and pixel data of the neighboring pixels have invalid values, the information obtaining section issues and allocates new label information to the target pixel.

3. The image display and data processing apparatus according to claim 1, wherein in the case where a target pixel has a valid value and pixel data of only one pixel of neighboring pixels has a valid value, the information obtaining section allocates issued label information, which has already been allocated to the one pixel having a valid value, to the target pixel, to update the position information and area information for each connected region.

4. The image display and data processing apparatus according to claim 1, wherein in the case where a target pixel has a valid value and pixel data of a plurality of pixels of the neighboring pixels have valid values, the information obtaining section allocates issued label information, which has already been allocated to one pixel selected from the plurality of pixels having valid values, to the target pixel, to update the position information and area information for each connected region.

5. The image display and data processing apparatus according to claim 1, wherein in the case where a target pixel has an invalid value, the information obtaining section does not issue and allocate label information to the target pixel.

6. The image display and data processing apparatus according to claim 1, further comprising an address list control section configured to control the information stored in the address list, wherein after completion of the sequential scanning for each line, the address list control section rearranges the address list so that the list indicates that the label information, which does not exist in the line buffer at completion of the sequential scanning for each line, is not allocated to any pixel, and thereby the label information which is not allocated to any pixel can be reused in the address list, while the address number is maintained in association with the position information and area information in the additional information memory.

7. An image processing method comprising:

performing sequential scanning on a plurality of photoreception elements arranged along an image pickup surface to determine a position of an external proximity object, and dynamically allocating label information to a target pixel, the label information identifying a connected pixel region in the image, and also dynamically updating position information and area information of the connected pixel region identified by the label information, depending on values of the pixel data of the target pixel and neighboring pixels thereof during the sequential scanning, so that the label information, the position information and the area information can be obtained for the image entirely on completion of the sequential scanning, the dynamically allocating and updating includes determining whether or not to allocate the label information to the target pixel and whether or not to update the position information and the area information of the connected region, depending on values of the pixel data of the target value and neighboring pixels thereof, issuing new label information on the basis of a determination result of the determining section, storing the label information in a line buffer, storing the position information and the area information associated with an address number respectively in an additional information memory, and storing in an address list (i) the label information stored in the line buffer, (ii) the address number stored in the additional information memory, and (iii) whether the label information is allocated to any pixel, in a manner such that the label information, address number and label allocation information are associated with each other.

8. The image processing method according to claim 7, further comprising controlling the information stored in the address list, wherein on the completion of the sequential scanning for each line, rearranging the address list so that the list indicates that the label information, which does not exist in the line buffer on the completion of the sequential scanning for each line, is not allocated to any pixel, and thereby the label information which is not allocated to any pixel can be reused in the address list, while the address number is maintained in association with the position information and area information in the additional information memory.

9. An image display and data input device comprising:

an input panel including a plurality of photoreception elements arranged along an image pickup surface to determine a position of an external proximity object;

a scanning section configured to perform a sequential scanning on photoreception elements to generate signals from the photoreception on elements;

an information obtaining section configured to dynamically allocate label information to a target pixel, the label information identifying a connected pixel region in the image, and also dynamically update position information and area information of the connected pixel region identified by the label information, depending on values of the pixel data of the target pixel and neighboring pixels thereof during the sequential scanning, so that the label information, the position information and the area information can be obtained for the image entirely on completion of the sequential scanning; and a position detection section configured to obtain at least one of position, shape, and size of the external proximity object on the basis of the label information, the position information, and the area information which are obtained by the information obtaining section, wherein the information obtaining section includes a determining section configured to determine whether or not to allocate the label information to the target pixel and whether or not to update the position information and the area information of the connected region, depending on values of the pixel data of the target value and neighboring pixels thereof, a label issuing section configured to issue new label information on the basis of a determination result of the determining section, a line buffer configured to store the label information therein, an additional information memory configured to store the position information and the area information associated with an address number respectively, and an address list configured to store (i) the label information stored in the line buffer, (ii) the address number stored in the additional information memory, and (iii) whether the label information is allocated to any pixel, in a manner such that the label information, address number and label allocation information are associated with each other.

10. An image display and data input device comprising:

an input/output panel including a plurality of display elements arranged along a display surface to display an image based on an image signal and a plurality of photoreception elements arranged along the display surface to determine a position of an external proximity object;

a scanning section configured to perform a sequential scanning on the photoreception elements to generate signals from the photoreception elements;

an information obtaining section configured to dynamically allocate label information to a target pixel, the label information identifying a connected pixel region in the image, and also dynamically update position information and area information of the connected pixel region identified by the label information, depending on values of the pixel data of the target pixel and neighboring pixels thereof during the sequential scanning, so that the label information, the position information and the area information can be obtained for the image entirely on completion of the sequential scanning; and a position detection section configured to obtain at least one of position, shape, and size of the external proximity object on the basis of the label information, the position information, and the area information which are obtained by the information obtaining section wherein the information obtaining section includes a determining section configured to determine whether or not to allocate the label information to the target pixel and whether or not to update the position information and the area information of the connected region, depending on values of the pixel data of the target value and neighboring pixels thereof, a label issuing section configured to issue new label information on the basis of a determination result of the determining section, a line buffer configured to store the label information therein, an additional information memory configured to store the position information and the area information associated with an address number respectively, and an address list configured to store (i) the label information stored in the line buffer, (ii) the address number stored in the additional information memory, and (iii) whether the label information is allocated to any pixel, in a manner such that the label information, address number and label allocation information is associated with each other.

11. An image display and data input device comprising:

a display panel and a position detection section, the display panel including a liquid crystal layer between a first substrate and a second substrate, the position detection section including a first sensor electrode and a second electrode which are allowed to come into contact with each other when the second substrate is depressed and detecting a depressed position of the second substrate corresponding to the position of an external proximity object by detecting a change in potential caused by contact between the first sensor electrode and the second sensor electrode;

an information obtaining section configured to dynamically allocate label information to a target pixel, the label information identifying a connected pixel region in the image, and also dynamically update position information and area information of the connected pixel region identified by the label information, depending on values of the pixel data of the target pixel and neighboring pixels thereof during the sequential scanning, so that the label information, the position information and the area information can be obtained for the image entirely on completion of the sequential scanning; and a position detection section configured to obtain at least one of position, shape, and size of the external proximity object on the basis of the label information, the position information, and the area information which are obtained by the information obtaining section wherein the information obtaining section includes a determining section configured to determine whether or not to allocate the label information to the target pixel and whether or not to update the position information and the area information of the connected region, depending on values of the pixel data of the target value and neighboring pixels thereof, a label issuing section configured to issue new label information on the basis of a determination result of the determining section, a line buffer configured to store the label information therein, an additional information memory configured to store the position information and the area information associated with an address number respectively, and an address list configured to store (i) the label information stored in the line buffer, (ii) the address number stored in the additional information memory, and (iii) whether the label information is allocated to any pixel, in a manner such that the label information, address number and label allocation information is associated with each other.

* * * * *